United States Patent
Kim et al.

(10) Patent No.: US 11,137,491 B2
(45) Date of Patent: Oct. 5, 2021

(54) METHOD AND APPARATUS FOR CONTROLLING RANGING IN WIRELESS COMMUNICATION SYSTEM

(71) Applicant: SAMSUNG ELECTRONICS CO., LTD., Suwon-si (KR)

(72) Inventors: Hyunchul Kim, Suwon-si (KR); Yi Yang, Suwon-si (KR); Seongah Jeong, Suwon-si (KR); Moonseok Kang, Suwon-si (KR); Sejong Yoon, Suwon-si (KR); Jonghyo Lee, Suwon-si (KR); Jonghoon Jang, Suwon-si (KR); Sehwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/678,497

(22) Filed: Nov. 8, 2019

(65) Prior Publication Data
US 2020/0150262 A1 May 14, 2020

(30) Foreign Application Priority Data
Nov. 9, 2018 (KR) .................. 10-2018-0137608

(51) Int. Cl.
*G01S 13/76* (2006.01)
*H04W 64/00* (2009.01)
*H04B 1/69* (2011.01)
*H04W 76/40* (2018.01)

(52) U.S. Cl.
CPC .......... *G01S 13/765* (2013.01); *G01S 13/762* (2013.01); *H04B 1/69* (2013.01); *H04W 64/006* (2013.01); *H04W 76/40* (2018.02)

(58) Field of Classification Search
None
See application file for complete search history.

(56) References Cited

U.S. PATENT DOCUMENTS

| | | | |
|---|---|---|---|
| 9,826,376 B2 | 11/2017 | Rudolf et al. | |
| 10,559,149 B1 * | 2/2020 | Kuechler | G01S 11/08 |
| 2010/0202303 A1 * | 8/2010 | Gu | G01S 11/02 |
| | | | 370/252 |

(Continued)

FOREIGN PATENT DOCUMENTS

KR 10-1122416 B1 3/2012

OTHER PUBLICATIONS

International Search Report and Written Opinion (PCT/ISA/210 & PCT/ISA/237) issued from the International Bureau in counterpart International Application No. PCT/KR2019/015075 dated Feb. 19, 2020.

(Continued)

*Primary Examiner* — German Viana Di Prisco
(74) *Attorney, Agent, or Firm* — Sughrue Mion, PLLC

(57) ABSTRACT

An electronic device and an operation method of the electronic device for transceiving data through ultra-wideband (UWB) in a wireless communication system are provided. The operation method includes broadcasting or multicasting, by the electronic device, a ranging start message including first data; receiving, by the electronic device from another electronic device, a ranging response message including second data; and broadcasting or multicasting, by the electronic device, a ranging final message including third data.

15 Claims, 22 Drawing Sheets

(56) References Cited

U.S. PATENT DOCUMENTS

| | | | |
|---|---|---|---|
| 2014/0204793 A1* | 7/2014 | Ben-Haim | G01S 13/767 |
| | | | 370/253 |
| 2015/0168537 A1* | 6/2015 | Amizur | G01S 5/14 |
| | | | 455/456.2 |
| 2016/0234703 A1* | 8/2016 | Aldana | H04L 1/16 |
| 2018/0302280 A1 | 10/2018 | Jiang et al. | |
| 2019/0135229 A1* | 5/2019 | Ledvina | H04W 4/80 |
| 2020/0100283 A1* | 3/2020 | Naguib | B60R 25/24 |

OTHER PUBLICATIONS

Leong, F., et al., "HRP UWB SRDEV PPDU Text Contribution" IEEE P802.15 Wireless Personal Area Networks, IEEE P802.15-18-2086-01-004z, Jul. 5, 2018, 18 pages.

Fofana, N., et al., "An Original Correction Method for Indoor Ultra Wide Band Ranging-based Localisation System", Computer Science, Networking and Internet Architecture (cs.NI), arXiv:1603.06736 [cs.NI], Mar. 22, 2016, pp. 1-14 (15 pages).

Sahinoglu, Z., et al., "Ranging in the IEEE 802.15.4a Standard", 2006 IEEE Annual Wireless and Microwave Technology Conference, Apr. 23 2007, pp. 1-5 (6 pages).

Neirynck, D., et al., "An alternative double-sided two-way ranging method", 2016 13th Workshop on Positioning, Navigation and Communications (WPNC), Jan. 19, 2017, pp. 1-4 (5 pages).

Jeong, S., et al., "Inclusion of Multicast/Broadcast Ranging in Information Element", IEEE P802.15 Working Group for Wireless Personal Area Networks (WPANs), Nov. 13, 2018, pp. 1-16 (17 pages).

* cited by examiner

FIG. 5

| Class 0 Payload IE ID (4 bit) (420) | Class 0 Payload IE Content (0/8 bytes) (430) | Abbreviation |
|---|---|---|
| 0 | Payload IE list terminator | |
| 1 | Ranging Request Reply Time IE | RRRT IE (501) |
| 2 | Ranging Reply Time Instantaneous IE | RRTI IE (502) |
| 3 | Ranging Reply Time Deferred IE | RRTD IE (503) |
| 4 | Ranging Preferred Reply Time IE | RPRT IE (504) |
| 5 | Ranging Control Double-sided TWR IE | RCDT IE (505) |
| 6 | Ranging Round Trip Measurement IE | RRTM IE (506) |
| 7 | Ranging Time-of-Flight IE | RTOF IE (507) |
| 8 | Interaction Time Adjustment IE | ITA IE (508) |
| 9 to 15 | Reserved | |

FIG. 6

| Control Info Value (Octets: 1) (600) | MEANING |
|---|---|
| 0 (610) | This frame is initiating DS-TWR and indicates that the initiating end does not require the ranging result |
| 1 (611) | This frame is initiating DS-TWR and requesting that the ranging result is sent back at end of exchange |
| 2 (612) | This frame is continuing the DS-TWR, forming the request for the 2nd TX-to-RX round-trip measurement |

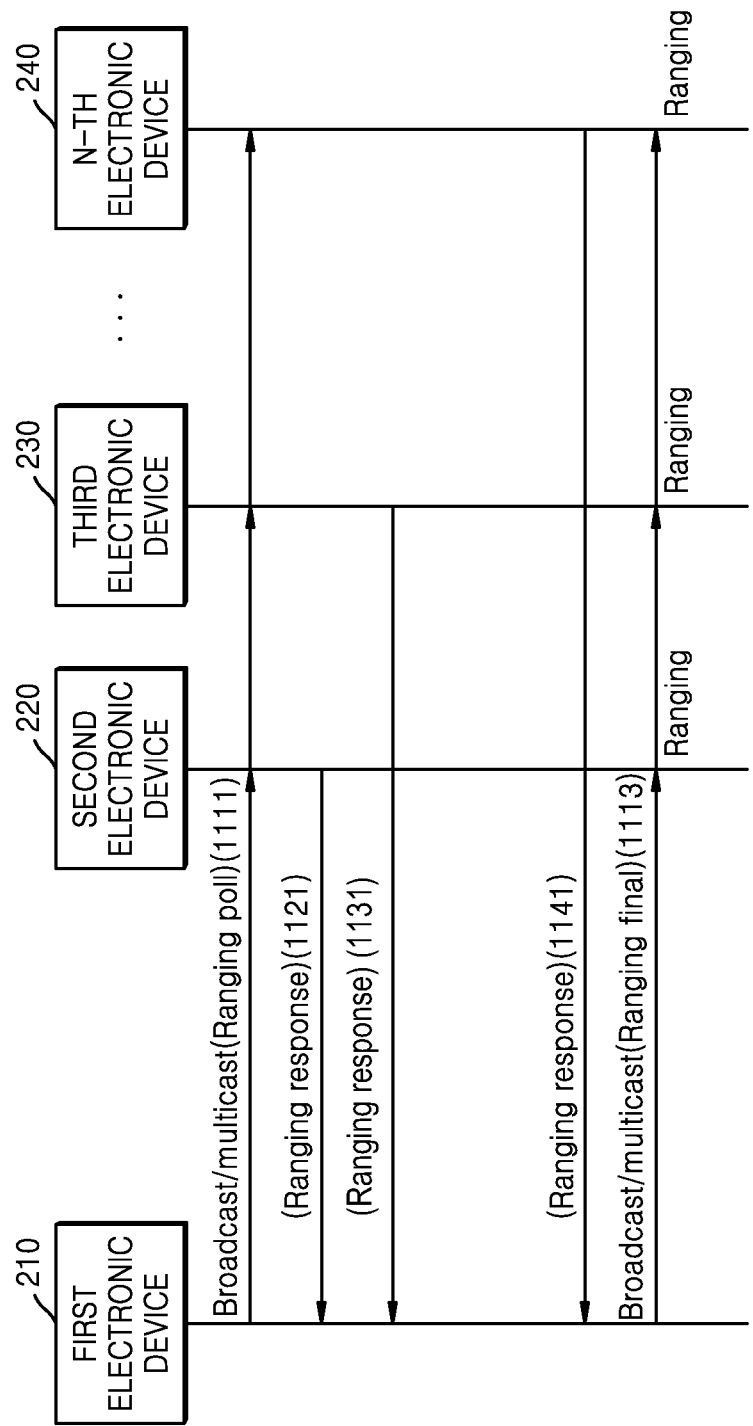

FIG. 12

| Control Info Value (600) | MEANING |
|---|---|
| 0 (610) | This frame is initiating DS-TWR and indicates that the initiating end does not require the ranging result |
| 1 (611) | This frame is initiating DS-TWR and requesting that the ranging result is sent back at end of exchange |
| 2 (612) | This frame is continuing the DS-TWR, forming the request for the 2nd TX-to-RX round-trip measurement |
| 3 (613) | This frame is initiating broadcast/multicast DS-TWR and indicates that the initiating end does not require the ranging result |
| 4 (614) | This frame is initiating broadcast/multicast DS-TWR and requesting that the ranging result is sent back at end of exchange |
| 5 (615) | This frame is initiating broadcast/multicast DS-TWR with additional report message for time stamp measurements and indicates that the initiating end does not require the ranging result |
| 6 (616) | This frame is initiating broadcast/multicast DS-TWR with additional report message for time stamp measurements and requesting that the ranging result is sent back at end of exchange |
| 7 (617) | This frame indicates Ranging Final message without timestamps in the broadcast/multicast DS-TWR |

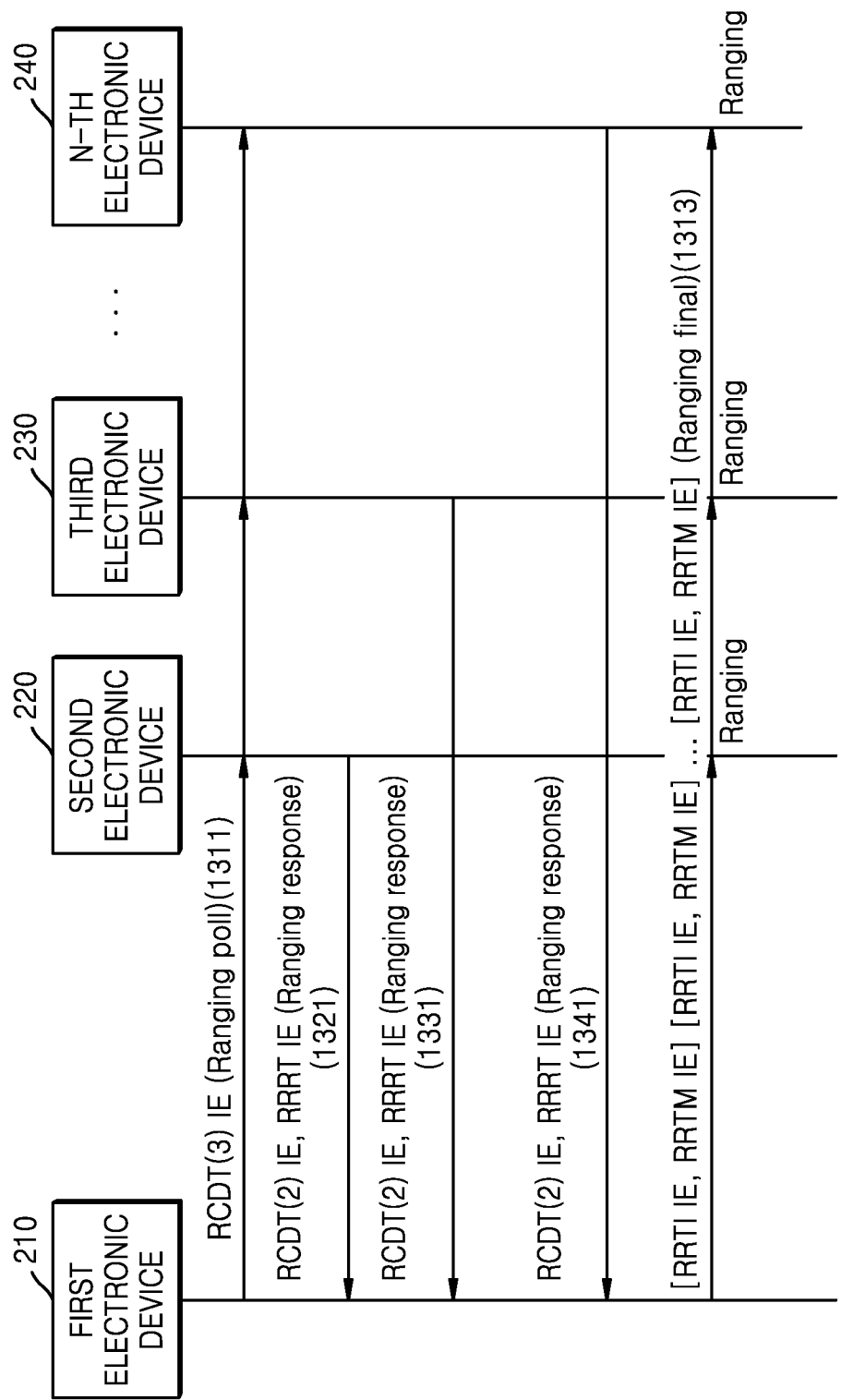

FIG. 19

| Sequential Ranging Control Info value (1710) | Interval (1720) | STS Data Init (1730) |
|---|---|---|
| 0x0 (1910) | 0x64 (1920) | X (1930) |

FIG. 21

| Sequential Ranging Control Info value (1710) | Interval (1720) | STS Data Init (1730) |
|---|---|---|
| 0x1 (2110) | 0x64 (2120) | 0x325041592E535953 (2130) |

FIG. 23

| Octets: 4 | Octets: 1 |
|---|---|
| RX to TX reply time/ TX to RX round-trip time (2311) | Ranging FoM (figure of merit) (2313) |

| Bit: 7 | 6 | 5 | 4 | 3 | 2 | 1 | 0 |
|---|---|---|---|---|---|---|---|
| Extension (2321) | Confidence Interval Scaling Factor field (2323) | | Confidence Interval field (2325) | | Confidence Level field (2327) | | |

| Confidence level (2327) | Bit 2 | Bit 1 | Bit 0 |
|---|---|---|---|
| No FoM | 0 | 0 | 0 |
| 20% | 0 | 0 | 1 |
| 55% | 0 | 1 | 0 |
| 75% | 0 | 1 | 1 |
| 85% | 1 | 0 | 0 |
| 92% | 1 | 0 | 1 |
| 97% | 1 | 1 | 0 |
| 99% | 1 | 1 | 1 |

| Confidence level (2325) | Bit 4 | Bit 3 |
|---|---|---|
| 100 ps | 0 | 0 |
| 300 ps | 0 | 1 |
| 1ns | 1 | 0 |
| 3ns | 1 | 1 |

| Confidence interval scaling factor (2323) | Bit 6 | Bit 5 |
|---|---|---|
| Confidence interval x 1/2 | 0 | 0 |
| Confidence interval x 1 | 0 | 1 |
| Confidence interval x 2 | 1 | 0 |
| Confidence interval x 4 | 1 | 1 |

| Meaning | Bit 7 (2321) | 6 | 5 | 4 | 3 | 2 | 1 | 0 |
|---|---|---|---|---|---|---|---|---|
| Ranging FoM value if a timestamp value was obtained without STSs | 0 | Any nonzero value | | | | | | |
| The timestamp report is uncorrected | 1 | 0 | 0 | 0 | 0 | 0 | 0 | 0 |
| Ranging FoM value if a timestamp value was obtained with STSs | 1 | Any nonzero value | | | | | | |

| Octets: 2 |
|---|
| Angle of Arrival (−180 to 180 (degree)) (2400) |

METHOD AND APPARATUS FOR CONTROLLING RANGING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0137608, filed on Nov. 9, 2018, in the Korean Intellectual Property Office, the disclosure of which is incorporated by reference herein in its entirety.

BACKGROUND

1. Field

The disclosure relates to a method and apparatus for controlling a ranging operation in a wireless communication system.

2. Description of the Related Art

The Internet has developed from a human-centered network via which people generate and consume information to an Internet of Things (IoT) network via which distributed components, such as things, transmit or receive information to or from each other and process the information. Internet of Everything (IoE) technology, in which big data processing technology is combined with IoT technology via connection with a cloud server or the like, is emerging. To implement IoT, technical elements, such as sensing technology, a wired/wireless communication and network infrastructure, service interface technology, and security technology, are required. Thus, a sensor network, machine to machine (M2M) communication, machine type communication (MTC), and the like for connection between things have recently been studied. In IoT environments, an intelligent Internet Technology (IT) service for collecting and analyzing data generated by connected things to create new value in people's lives may be provided. IoT is applicable to various fields, such as smart homes, smart buildings, smart cities, smart cars or connected cars, smart grids, health care, smart home appliances, and advanced medical care, via the convergence and combination of existing information technology (IT) with various industries.

Because wireless communication systems may provide various services due to the development of the above wireless communication systems, methods of effectively providing these services are required. There is also demand for a method of efficiently transceiving data among a plurality of electronic devices.

SUMMARY

Provided is an operation method of an electronic device that tranceives data through an ultra wideband (UWB) in a wireless communication system.

Additional aspects will be set forth in part in the description which follows and, in part, will be apparent from the description, or may be learned by practice of the presented embodiments.

In accordance with an aspect of the disclosure, an operation method of an electronic device for transceiving data through an ultra wideband (UWB) in a wireless communication system includes the operations of: broadcasting or multicasting, by the electronic device, a ranging start message including first data; receiving, by the electronic device from another electronic device, a ranging response message including second data; and broadcasting or multicasting, by the electronic device, a ranging final message including third data.

The third data may include time information used to measure a distance between the electronic device and the other electronic device.

The first data may include first information requesting the other electronic device to measure time of flight (ToF); and the operation method may further include receiving, by the electronic device from the other electronic device, fourth data that is the ToF measured by the other electronic device based on the first information.

The first data may include information informing that fifth data including time information used to measure a distance between the electronic device and the other electronic device is to be transmitted; and the operation method may further include broadcasting or multicasting, by the electronic device, the fifth data.

The first data may further include first information requesting the other electronic device to measure time of flight (ToF); and the operation method may further include receiving, by the electronic device from the other electronic device, fourth data that is the ToF measured by the other electronic device based on the first information.

The operation method may further include transmitting, by the electronic device to the other electronic device, interval information used to schedule a ranging operation.

The operation method may further include transmitting, by the electronic device to the other electronic device, scrambled timestamp sequence initial information used for security of a ranging operation.

The operation method may further include transmitting, by the electronic device to the other electronic device, a figure of merit (FoM) for transmission of timestamp measurement information based on a ranging operation.

The FoM may include information about whether a secure ranging operation has failed.

The operation method may further include transmitting, by the electronic device to the other electronic device, angle information about an angle with respect to the other electronic device, the angle information being used to estimate a location relative to the other electronic device.

In accordance with another aspect of the disclosure, an electronic device for transceiving data in a wireless communication system, includes: at least one transceiver; at least one memory storing a program; and at least one processor configured to execute the program to control the at least one transceiver to: broadcast or multicast a ranging start message including first data; receive, from another electronic device, a ranging response message including second data; and broadcast or multicast a ranging final message including third data.

The third data may include time information used to measure a distance between the electronic device and the other electronic device.

The first data may include first information requesting the other electronic device to measure time of flight (ToF); and the at least one processor may be further configured to control the at least one transceiver to receive, from the other electronic device, fourth data that is the ToF measured by the other electronic device based on the first information.

The first data may include information informing that fifth data including time information used to measure a distance between the electronic device and the other electronic device is to be transmitted; and the at least one processor may be further configured to control the at least one transceiver to broadcast or multicast the fifth data.

The first data may further include first information requesting the other electronic device to measure time of flight (ToF); and the at least one processor may be further configured to control the at least one transceiver to receive, from the other electronic device, fourth data that is the ToF measured by the other electronic device based on the first information.

The at least one processor may be further configured to control the at least one transceiver to transmit, to the other electronic device, interval information used to schedule a ranging operation.

The at least one processor may be further configured to control the at least one transceiver to transmit, to the other electronic device, scrambled timestamp sequence initial information used for security of a ranging operation.

The at least one processor may be further configured to control the at least one transceiver to transmit, to the other electronic device, a figure of merit (FoM) for transmission of timestamp measurement information based on a ranging operation.

The FoM may include information about whether a secure ranging operation has failed.

The at least one processor may be further configured to control the at least one transceiver to transmit, to the other electronic device, angle information about an angle with respect to the other electronic device, the angle information being used to estimate a location relative to the other electronic device.

In accordance with another aspect of the disclosure, a non-transitory computer-readable recording medium has recorded thereon instructions executable by at least one processor of an electronic device to perform an operation method for transceiving data through ultra-wideband (UWB) in a wireless communication system, the operation method including: broadcasting or multicasting, by the electronic device, a ranging start message including first data; receiving, by the electronic device from another electronic device, a ranging response message including second data; and broadcasting or multicasting, by the electronic device, a ranging final message including third data.

The third data may include time information used to measure a distance between the electronic device and the other electronic device.

The first data may include first information requesting the other electronic device to measure time of flight (ToF); and the operation method may further include receiving, by the electronic device from the other electronic device, fourth data that is the ToF measured by the other electronic device based on the first information.

The first data may include information informing that fifth data including time information used to measure a distance between the electronic device and the other electronic device is to be transmitted; and the operation method may further include broadcasting or multicasting, by the electronic device, the fifth data.

The first data may further include first information requesting the other electronic device to measure time of flight (ToF); and the operation method may further include receiving, by the electronic device from the other electronic device, fourth data that is the ToF measured by the other electronic device based on the first information.

The operation method may further include transmitting, by the electronic device to the other electronic device, interval information used to schedule a ranging operation.

The operation method may further include transmitting, by the electronic device to the other electronic device, scrambled timestamp sequence initial information used for security of a ranging operation.

The operation method may further include transmitting, by the electronic device to the other electronic device, a figure of merit (FoM) for transmission of timestamp measurement information based on a ranging operation.

The FoM may include information about whether a secure ranging operation has failed.

The operation method may further include transmitting, by the electronic device to the other electronic device, angle information about an angle with respect to the other electronic device, the angle information being used to estimate a location relative to the other electronic device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table showing a structure of payload information elements including an IE ID and IE content;

FIG. 6 is a table for explaining the types of a Ranging Control Double-sided TWR (RCDT) IE;

FIG. 11 is a schematic diagram illustrating a ranging operation of an electronic device, according to an embodiment;

FIG. 12 is a table for explaining the types of RCDT IE according to an embodiment;

FIG. 13 is a schematic diagram for explaining ranging operations of electronic devices, according to a (1-1)th embodiment;

FIG. 19 is a table for explaining an example of information corresponding to a Sequential Ranging Control (SRC) IE according to a (2-1)th embodiment;

FIG. 21 is a table for explaining an example of information corresponding to an SRC IE according to a (2-2)th embodiment;

FIG. 23 is a table for explaining a structure of a content field of an IE related to timestamp measurement information according to a third embodiment;

DETAILED DESCRIPTION

Figure 1:
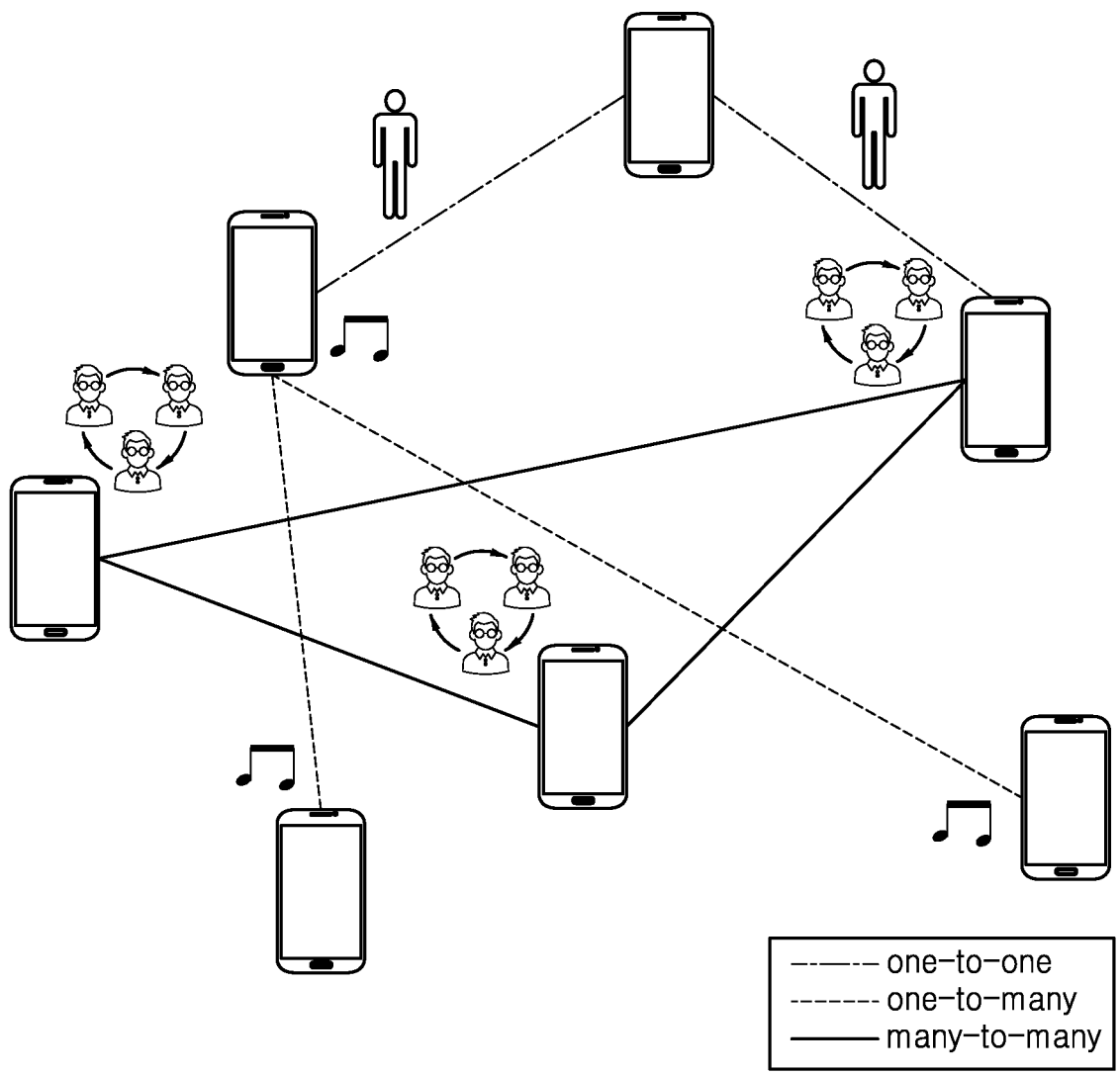
FIG. 1 is a diagram for describing a general Device-to-Device (D2D) communication procedure.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein. In the drawings, like numbers refer to like elements throughout.

Throughout the disclosure, expressions such as "at least one of a, b or c" or "at least one of a, b and c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Although general terms widely used at present were selected for describing the disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

While such terms as "first," "second," etc., may be used to describe various components or embodiments, such components or embodiments are not limited to the above terms. The above terms are used only to distinguish one component or embodiment from another.

The terms used in the present specification are merely used to describe particular embodiments, and are not intended to limit the scope of the disclosure. An expression used in the singular encompasses the expression in the plural, unless it has a clearly different meaning in the context. Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this disclosure, specify the presence of stated elements, but do not preclude the presence or addition of one or more other elements.

The use of the terms "a," "an," "the" and similar referents in the context of describing the disclosure (including in the context of the following claims) are to be construed to cover both the singular and the plural. Also, the steps of all methods described herein can be performed in any suitable order unless otherwise indicated herein or otherwise clearly contradicted by context. Embodiments of the disclosure are not limited to the described order of the operations.

Thus, the expression "according to an embodiment" used in the entire disclosure does not necessarily indicate the same embodiment.

Embodiments of the disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of techniques according to the related art for electronics configuration, signal processing and/or control, data processing and the like. The words "mechanism," "element," "means," and "configuration" are used broadly and are not limited to mechanical or physical embodiments.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

In general, a wireless sensor network technology is broadly classified into a wireless local area network (WLAN) and a wireless personal area network (WPAN) according to coverage. In this regard, the WLAN refers to a technology that is based on the Institute of Electrical and Electronics Engineers (IEEE) 802.11 and is capable of accessing a backbone network within a range of 100 meters. Also, the WPAN refers to a technology that is based on the IEEE 802.15 and includes Bluetooth, ZigBee, ultra-wideband (UWB), or the like. A wireless sensor network in which the wireless sensor network technology is implemented consists of a plurality of communication electronic devices. In this regard, the communication electronic devices perform communication in an ACTIVE period by using a single channel. In other words, the communication electronic devices collect a packet in real time, and transmit the collected packet in the ACTIVE period.

The UWB may refer to a short range high-speed wireless communication technology using a wide frequency band of at least several GHz, a low spectrum density, and a small pulse bandwidth (1 to 4 nsec) in a baseband state. The UWB may indicate a bandwidth itself to which UWB communication is applied. Hereinafter, a communication method by electronic devices will now be described based on the UWB, but this is only an example and the communication method may be applied to various wireless communication technologies in a practical use.

An electronic device according to embodiments may include a mobile phone, a smartphone, a mobile terminal, a laptop computer, a terminal for digital broadcasting, a personal digital assistant (PDA), a portable multimedia player (PMP), navigation, a slate personal computer (slate PC), a tablet PC, an ultrabook, a telematics terminal, a media device, a digital television (digital TV), a desktop computer, a refrigerator, a projector, a vehicle, a smart car, a printer, or the like.

The disclosure will now be described more fully with reference to the accompanying drawings, in which embodiments are shown.

FIG. 1 is a diagram for describing a general Device-to-Device (D2D) communication procedure.

D2D communication refers to direct communication between geographically adjacent electronic devices, without using infrastructure such as a base station. The D2D communication may use an unlicensed frequency band such as Wi-Fi Direct or Bluetooth. Also, the D2D communication may use a licensed frequency band, thereby improving frequency usage efficiency of a cellular system. Hereinafter, the D2D communication indicates communication between objects or machine to machine (M2M), as well as communication between not only simple devices embedded with a communication function but also communication between various types of devices such as smartphones or personal computers having a communication function.

Peer Aware Communication (PAC) is a communication scheme for a device and a service in a short range and is one of technologies of the D2D communication. In the PAC, a D2D electronic device may be called a Peer Aware Communication Device (PD).

As illustrated in FIG. 1, in the PAC, there may be a one-to-one communication scheme by which one PD communicates with another PD, a one-to-many communication scheme by which one PD communicates with a plurality of PDs, and a many-to-many communication scheme by which a plurality of PDs communicate with a plurality of PDs.

Figure 2:
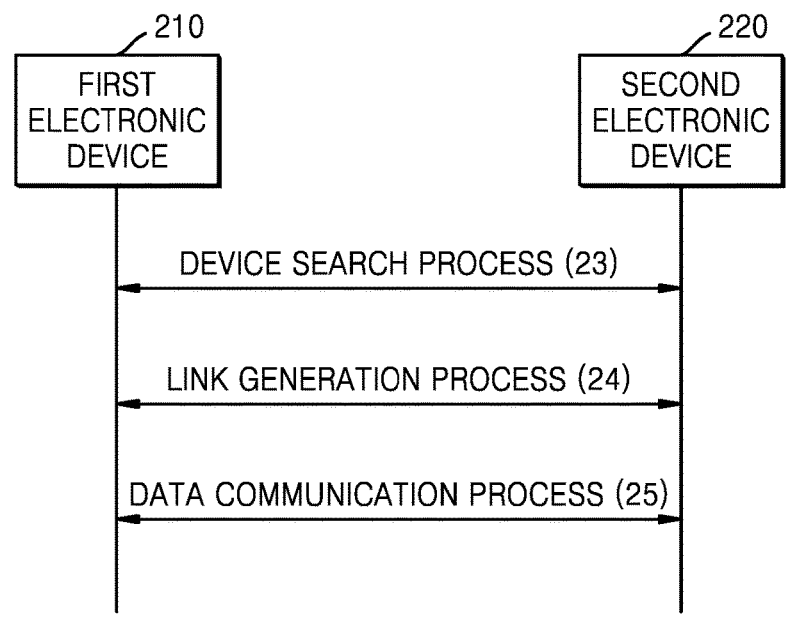
FIG. 2 illustrates communication processes between a plurality of electronic devices.

FIG. 2 illustrates communication processes by a plurality of electronic devices.

Referring to FIG. 2, a first electronic device 210 and a second electronic device 220 may mutually perform communication via a device search process 23, a link generation process 24, and a data communication process 25.

In the device search process 23, each of the first electronic device 210 and the second electronic device 220 may search for other electronic devices that are capable of the D2D communication from among electronic devices around the first electronic device 210 and the second electronic device 220. In the device search process 23, each of the first electronic device 210 and the second electronic device 220 may determine whether to generate a link for the D2D communication. For example, the first electronic device 210 may transmit a search signal to allow the second electronic device 220 to discover the first electronic device 210. Also, the first electronic device 210 may receive a search signal transmitted from the second electronic device 220 and may thereby recognize that other electronic devices capable of the D2D communication are present in a D2D communication range.

In the link generation process 24, each of the first electronic device 210 and the second electronic device 220 may generate a data transmission link for an electronic device to which data is to be transmitted from among electronic devices discovered in the device search process 23. For example, the first electronic device 210 may generate a data transmission link for the second electronic device 220 discovered by the first electronic device 210 in the device search process 23.

In the data communication process 25, the first electronic device 210 and the second electronic device 220 may transceive data with respective devices for which links have been generated in the link generation process 24. For example, the first electronic device 210 may transceive data with the second electronic device 220 via the data transmission link generated in the link generation process 24.

Figure 3:
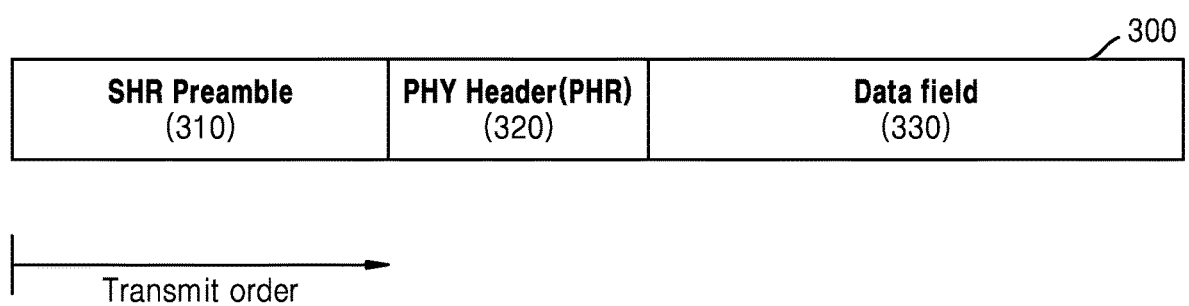
FIG. 3 illustrates a structure of an ultra-wideband physical (UWB PHY) frame.

FIG. 3 illustrates a structure of a UWB physical (UWB PHY) frame 300.

Referring to FIG. 3, the UWB PHY frame 300 may include a synchronization header (SHR) preamble 310, a PHY header (PHR) 320, and a data field 330.

The SHR preamble 310 may be used in at least one of an automatic gain control (AGC), signal acquisition, frequency offset estimation, packet synchronization, channel estimation, ranging, or the like. In detail, the SHR preamble 310 may be added, prior to the PHR 320, for a receiver algorithm related to AGC setting, antenna diversity selection, timing acquisition, a frequency recovery, packet and frame synchronization, channel estimation, and leading-edge signal tracking for ranging. The SHR preamble 310 may be referred to as a preamble code.

The PHR 320 may include contents of a PHY protocol data unit (PPDU) and information about a protocol used in transmitting the PPDU.

The data field 330 may include data that is transceived.

In a wireless communication system, an SHR preamble may be transmitted as a head of a frame so as to obtain synchronization between a transmitter and a receiver. The SHR preamble may be a signal agreed between the transmitter and the receiver. In the wireless communication system, the SHR preamble may be determined to allow fast synchronization between the transmitter and the receiver via a start point of the frame.

Figure 4:
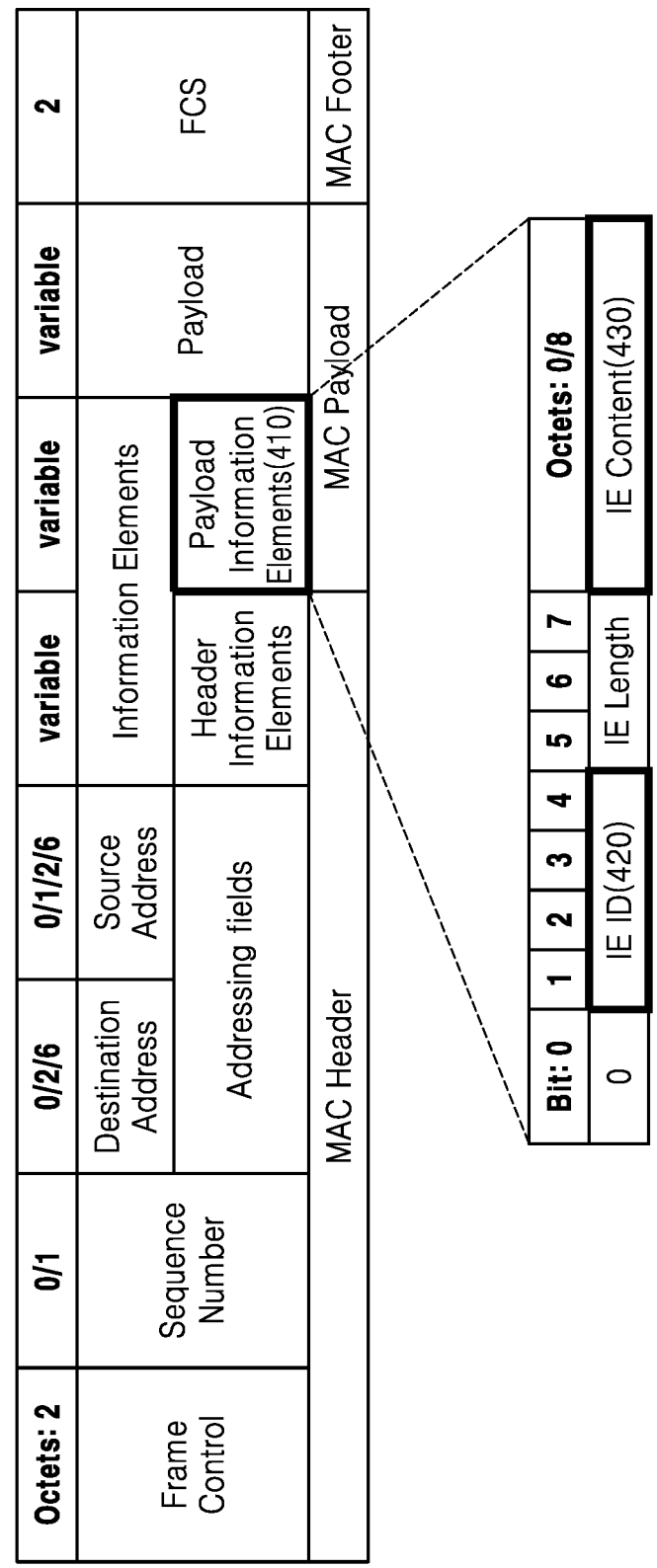
FIG. 4 is a diagram for explaining a structure of payload information elements (IEs) of a UWB media access control (MAC) frame.

FIG. 4 is a diagram for explaining a structure of payload information elements (IEs) of a UWB media access control (MAC) frame.

Referring to FIG. 4, the UWB MAC frame may include a MAC header, a MAC payload, a MAC footer.

The UWB MAC frame may include frame control, a sequence number, a destination address, a source address, addressing fields, information elements, header information elements, payload information elements 410, a payload, and a frame check sequence (FCS).

The payload information elements 410 may include data fields that are used in a ranging operation for estimating a distance between a plurality of electronic devices. The payload information elements 410 may be referred to as a Class 0 payload IE.

The payload information elements 410 may include an information element identifier (IE ID) 420, an IE length, and IE content 430.

The IE ID 420 may consist of a total of four bits from bit No. 1 to bit No. 4.

The IE content 430 may consist of 8 bytes (64 bits). In detail, when octets are 0, the IE content 430 may not be included in the payload information elements 410. When octets are 8, the IE content 430 may be included in the payload information elements 410 and may consist of 8 bytes (64 bits).

FIG. 5 is a table showing a structure of the payload information elements 410 including the IE ID 420 and the IE content 430.

Referring to FIG. 5, the payload information elements 410 may include a Ranging Request Reply Time (RRRT) IE 501, a Ranging Reply Time Instantaneous (RRTI) IE 502, a Ranging Reply Time Deferred (RRTD) IE 503, a Ranging Preferred Reply Time (RPRT) IE 504, a Ranging Control Double-sided Two-Way Ranging (TWR) (RCDT) IE 505, a Ranging Round Trip Measurement (RRTM) IE 506, a Ranging Time-of-Flight (RTOF) IE 507, and an Interaction Time Adjustment (ITA) IE 508.

The RRRT IE 501 may be used to request an electronic device performing a ranging operation for a ranging reply time.

The RRTI IE 502 may be used to previously determine a transmission time period of a frame including an IE.

The RRTD IE 503 may be used for a TWR exchange to be completed. The RRTD IE 503 may also be used when an electronic device is unable to determine a reply time until a reply is transmitted.

The RPRT IE 504 may refer to the capability of an electronic device to transmit a ranging reply.

The RCDT IE 505 may be used to control the TWR exchange.

The RRTM IE 506 may refer to a difference between a frame transmission time when a round trip measurement has started and a frame reception time when the round trip measurement has been completed.

The RTOF IE 507 may refer to a time-of-flight between the transmitter and the receiver.

The ITA IE 508 may be used to adjust a frame transmission time period for interaction with an electronic device.

FIG. 6 is a table for explaining types of the RCDT IE 505.

Referring to FIG. 6, a control information value 600 may be included in the IE content 430 and then transmitted.

When the control information value 600 is 0 (610), a frame including RCDT(0) IE may initiate double-sided two-way ranging (DS-TWR) and indicate that the transmitter does not require a ranging result.

When the control information value 600 is 1 (611), a frame including RCDT(1) IE may initiate DS-TWR and request that the ranging result is sent back when exchange ends.

When the control information value 600 is 2 (612), a frame including RCDT(2) IE may form a request for a second TX-to-RX round-trip measurement while continuing the DS-TWR.

Figure 7:
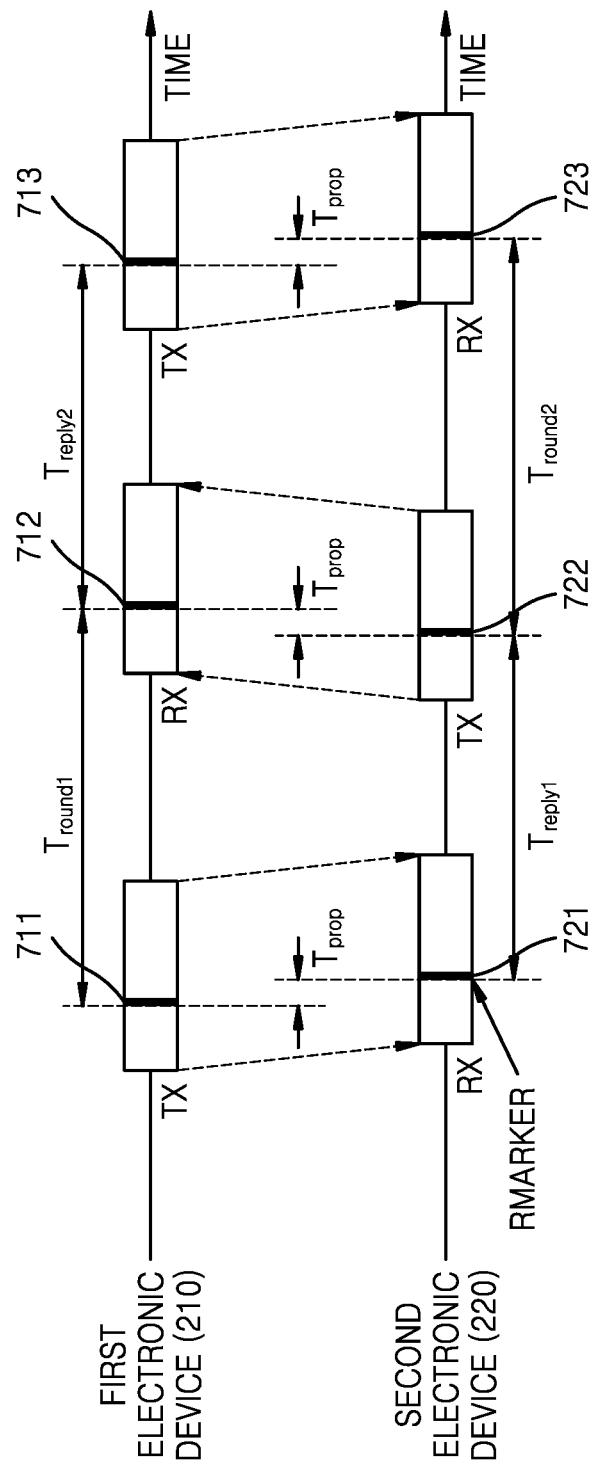
FIG. 7 is a schematic diagram for describing Double-sided Two-Way Ranging (DS-TWR) operations of electronic devices.

FIG. 7 is a schematic diagram for describing DS-TWR operations of electronic devices.

RMARKER shown in FIG. 7 may refer to data in a frame so as to define a reference time point. Based on RMARKER, an electronic device may measure a time interval.

The first electronic device 210 may measure, as $T_{round1}$, a time between 1-1 RMARKER 711 and 1-2 RMARKER 712, the 1-1 RMARKER 711 included in a frame transmitted (TX) to the second electronic device 220 and the 1-2 RMARKER 712 included in a frame received (RX) from the second electronic device 220.

The second electronic device 220 may measure, as $T_{reply1}$, a time between 2-1 RMARKER 721 and 2-2 RMARKER 722, the 2-1 RMARKER 721 included in a frame received (RX) from the first electronic device 210 and the 2-2 RMARKER 722 included in a frame transmitted (TX) to the first electronic device 210.

The first electronic device 210 may measure, as $T_{reply2}$, a time between 1-2 RMARKER 712 and 1-3 RMARKER 713, the 1-2 RMARKER 721 included in a frame received (RX) from the second electronic device 220 and the 1-3 RMARKER 713 included in a frame transmitted (TX) to the first electronic device 210.

The first electronic device 210 may measure, as $T_{round2}$, a time between 2-2 RMARKER 722 and 2-3 RMARKER 723, the 2-2 RMARKER 722 included in a frame transmitted (TX) to the second electronic device 220 and the 2-3 RMARKER 723 included in a frame received (RX) from the second electronic device 220.

Time-of-Flight (ToF) time $T_{prop}$ may be calculated according to Equation 1 below.

$$\hat{T}_{prop} = \frac{(T_{round1} \times T_{round2} - T_{reply1} \times T_{reply2})}{(T_{round1} + T_{round2} + T_{reply1} + T_{reply2})} \qquad \text{[Equation 1]}$$

Figure 8:
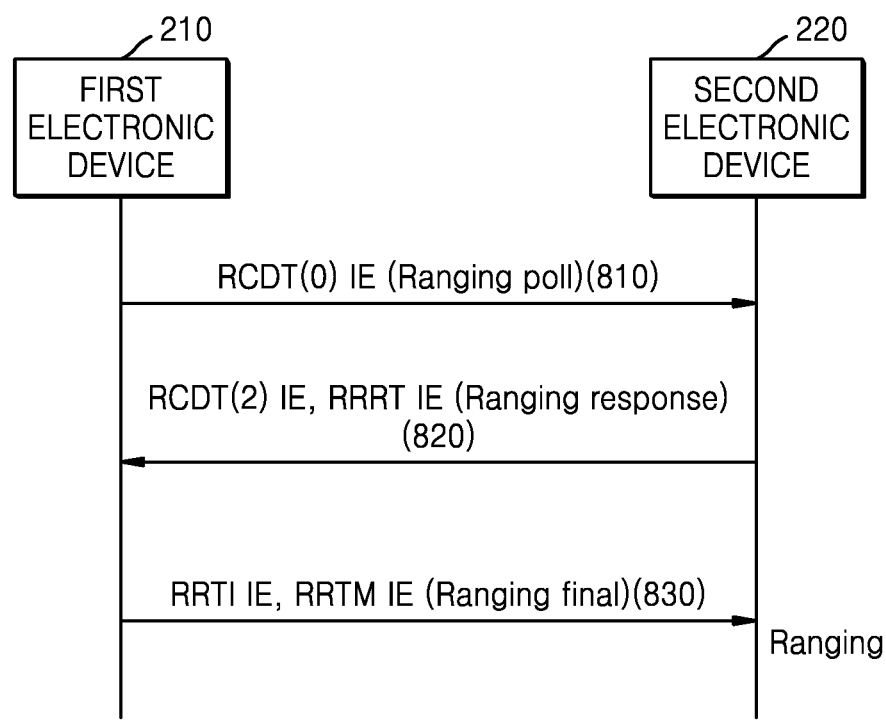
FIG. 8 is a schematic diagram for explaining DS-TWR operations of electronic devices.

FIG. 8 is a schematic diagram for explaining DS-TWR operations of electronic devices.

Referring to FIG. 8, in operation 810, the first electronic device 210 may start a ranging operation (Ranging poll) by transmitting a data frame including RCDT(0) IE to the second electronic device 220.

In operation 820, the second electronic device 220 may transmit (Ranging response) a data frame including RCDT (2) IE and RRRT IE to the first electronic device 210. In this regard, the second electronic device 220 may measure $T_{reply1}$. As described above, $T_{reply1}$ may indicate a time between RMARKER included in a data frame received (RX) by the second electronic device 220 from the first electronic device 210 and RMARKER included in a data frame transmitted (TX) by the second electronic device 220 to the first electronic device 210. Hereinafter, measurement principles related to time intervals described with reference to FIG. 7 are equally applied to $T_{reply2}$, $T_{round1}$, and $T_{round2}$.

In operation 830, the first electronic device 210 may transmit (Ranging final), to the second electronic device 220, a data frame including RRTI IE ($T_{reply2}$) and RRTM IE ($T_{round1}$) that are each timestamp information.

The second electronic device 220 may measure a value of $T_{round2}$, and may calculate the ToF time $T_{prop}$ according to Equation 1 described above.

An estimated distance (Ranging) between two electronic devices may be calculated by multiplying $T_{prop}$ by speed of light (Cambria Math).

Figure 9:
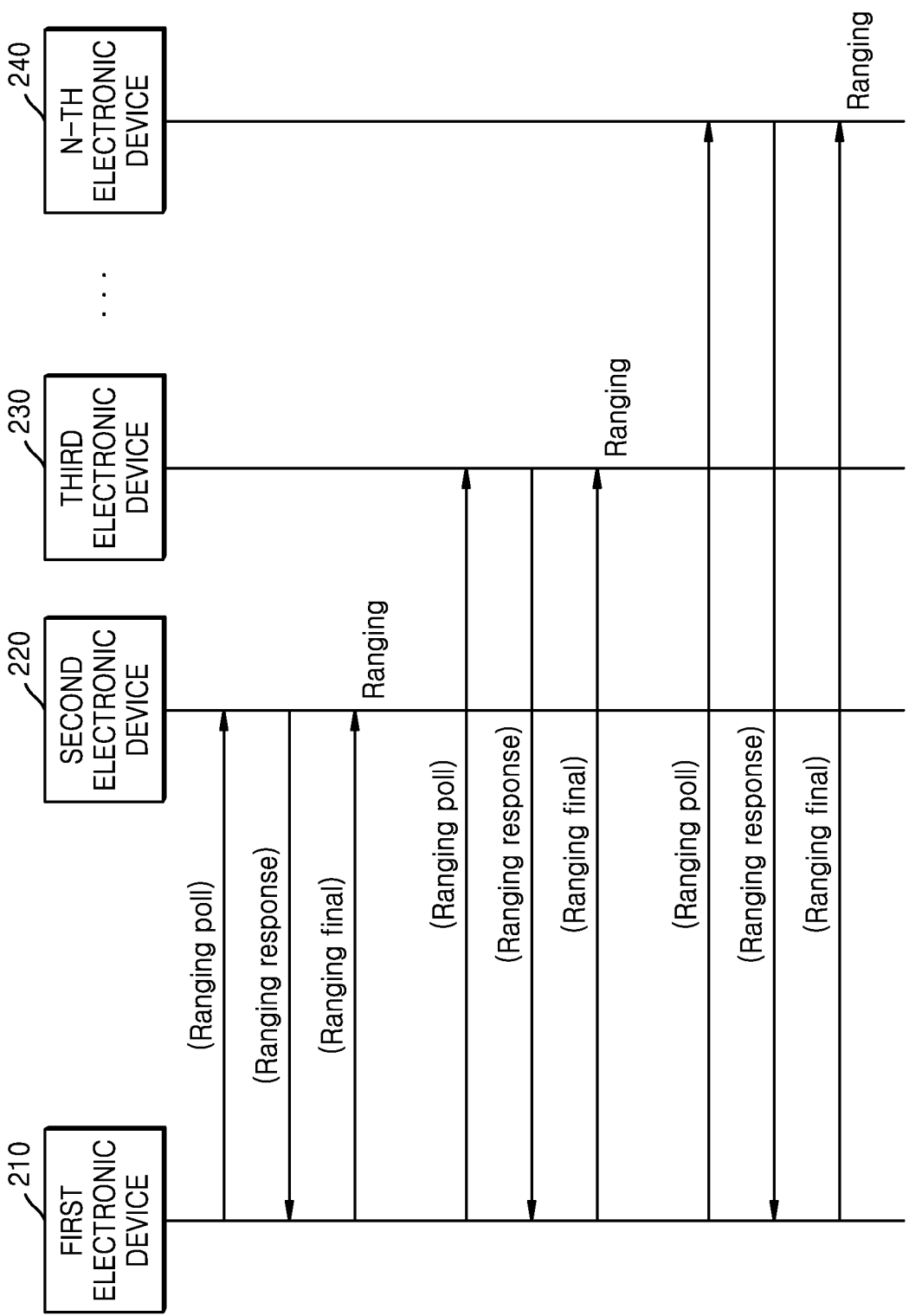
FIG. 9 is a diagram illustrating a message transmission process when there are a plurality of target electronic devices seeking to calculate time of flight (To F)

FIG. 9 is a diagram illustrating a message transmission process when there are a plurality of target electronic devices seeking to calculate a ToF.

Referring to FIG. 9, to perform a ToF calculation on each of a second electronic device 220, a third electronic device 230, and an N-th electronic device 240, a first electronic device 210 may transmit a ranging message to each of the second electronic device 220, the third electronic device 230, and the N-th electronic device 240.

In detail, the first electronic device 210 may start a ranging operation (Ranging poll) by transmitting, to each of the second electronic device 220, the third electronic device 230, and the N-th electronic device 240, a data frame including RCDT(0) IE.

Each of the second electronic device 220, the third electronic device 230, and the N-th electronic device 240 may transmit (Ranging response) a data frame including RCDT(2) IE and RRRT IE to the first electronic device 210. At this time, each of the second electronic device 220, the third electronic device 230, and the N-th electronic device 240 may measure $T_{reply1}$.

The first electronic device 210 may transmit (Ranging final) a data frame including RRTI IE ($T_{reply2}$) and RRTM IE ($T_{round1}$), which are each timestamp information, to each of the second electronic device 220, the third electronic device 230, and the N-th electronic device 240.

At this time, the first electronic device 210, which starts ranging, may repeatedly transmit a Ranging final message including timestamp measurement values ($T_{reply2}$ and $T_{round1}$) and a Ranging poll message to each of the second electronic device 220 through the N-th electronic device 240.

Figure 10:
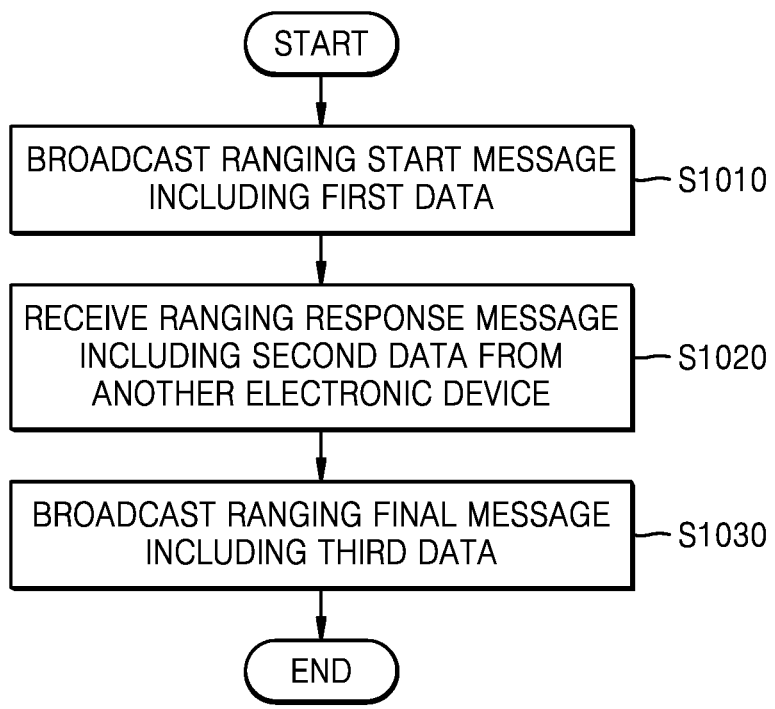
FIG. 10 is a flowchart of an operation method of an electronic device, according to an embodiment.

FIG. 10 is a flowchart of an operation method of an electronic device, according to an embodiment.

Referring to FIG. 10, in operation S1010, the electronic device may broadcast a ranging start message including first data. It is understood that one or more other embodiments are not limited to the broadcasting. For example, according to another embodiment, an electronic device may multicast first data about the starting of a ranging operation. For convenience of explanation, broadcasting will be exemplified below.

In operation S1020, the electronic device may receive a ranging response message including second data from another electronic device.

In operation S1030, the electronic device may broadcast a ranging final message including third data. It is understood that one or more other embodiments are not limited to the broadcasting. For example, according to another embodiment, an electronic device may multicast the ranging final message. For convenience of explanation, broadcasting will be exemplified below.

The third data may include time information used to measure a distance between the electronic device and the other electronic device.

The first data may include first information that requests the other electronic device to measure a ToF.

The electronic device may receive, from the other electronic device, fourth data that is the ToF measured based on the first information by the other electronic device.

The first data may include information informing that fifth data including the time information used to measure the distance between the electronic device and the other electronic device is to be broadcast.

The electronic device may broadcast the fifth data.

The first data may include the first information that requests the other electronic device to measure a ToF.

The electronic device may receive, from the other electronic device, the fourth data that is the ToF measured based on the first information by the other electronic device.

The electronic device may transmit, to the other electronic device, interval information used to schedule a ranging operation.

The electronic device may transmit, to the other electronic device, the interval information used to schedule a ranging operation and a scrambled timestamp sequence initial information used for security of the ranging operation.

The electronic device may transmit, to the other electronic device, a figure of merit (FoM) for transmission of timestamp measurement information based on the ranging operation.

The FoM may include information about whether a secure ranging operation fails.

The electronic device may transmit, to the other electronic device, angle information about an angle relative to the other electronic device, which is used to estimate a location relative to the other electronic device.

According to embodiments, when there are a plurality of electronic devices seeking to perform a distance calculation based on UWB, network efficiency may be improved by newly defining an IE for a DS-TWR method capable of broadcasting a duplicate message.

Furthermore, according to embodiments, when a plurality of ranging procedures are consecutively considered, the electronic device may convert a mode into a sleep mode and an active mode according to IE information, via an IE for ranging start information and ranging duration information. Accordingly, power consumption of the electronic device may be reduced.

Also, according to embodiments, ranging usability of the electronic device may be increased via ranging FoM information that is reliability information of timestamp measurement information.

Moreover, according to embodiments, when the angle information is considered to estimate the location of the electronic device, the electronic device may operate regardless of a UWB chip manufacturer, via an angle of arrival (AOA) IE. Thus, power efficiency of the electronic device and network efficiency may be increased.

FIG. 11 is a schematic diagram illustrating a ranging operation of an electronic device, according to an embodiment.

To perform a ToF calculation on each of the second electronic device 220, the third electronic device 230, and the N-th electronic device 240, the first electronic device 210 may broadcast ranging messages.

In detail, with reference to FIG. 11, in operation 1111, the first electronic device 210 may broadcast a data frame to start a ranging operation (Ranging poll).

In operation 1121, the second electronic device 220, may transmit a data frame to the first electronic device 210 (Ranging response). In operation 1131, the third electronic device 230 may transmit a data frame to the first electronic device 210 (Ranging response). In operation 1141, the N-th electronic device 240 may transmit a data frame to the first electronic device 210 (Ranging response).

In operation 1113, the first electronic device 210 may transmit the data frame to each of the second electronic device 220, the third electronic device 230, and the N-th electronic device 240 (Ranging final).

FIG. 12 is a table for explaining the types of RCDT IE (505) according to one or more embodiments.

A control information value 600 may be included in the IE content 430 and then transmitted.

When the control information value 600 is 0 (610), a frame including RCDT(0) IE may initiate DS-TWR and indicate that the transmitter does not require a ranging result.

When the control information value 600 is 1 (611), a frame including RCDT(1) IE may initiate DS-TWR and request that the ranging result is sent back when exchange ends.

When the control information value 600 is 2 (612), a frame including RCDT(2) IE may form a request for a second TX-to-RX round-trip measurement while continuing the DS-TWR.

When the control information value 600 is 3 (613), a frame including RCDT(3) IE may initiate broadcast/multicast DS-TWR and indicate that the transmitter does not require a ranging result.

When the control information value 600 is 4 (614), a frame including RCDT(4) IE may initiate broadcast/multicast DS-TWR and request that the ranging result is sent when exchange ends.

When the control information value 600 is 5 (615), a frame including RCDT(5) IE may initiate broadcast/multicast DS-TWR with an additional report message for timestamp measurement, and may indicate that the transmitter does not require a ranging result.

When the control information value 600 is 6 (616), a frame including RCDT(6) IE may initiate broadcast/multicast DS-TWR with an additional report message for timestamp measurement, and may request that a ranging result is sent when exchange ends.

When the control information value 600 is 7 (617), a frame including RCDT(7) IE may indicate a Ranging Final message without timestamps in the broadcast/multicast DS-TWR.

FIG. 13 is a schematic diagram for explaining ranging operations of electronic devices, according to a (1-1)th embodiment.

Referring to FIG. 13, in operation 1311, the first electronic device 210 may start a ranging operation (Ranging poll) by broadcasting a data frame including RCDT(3) IE to the second electronic device 220, the third electronic device 230, and the N-th electronic device 240. As described above, the frame including RCDT(3) IE may initiate broadcast/multicast DS-TWR and indicate that the transmitter does not require a ranging result.

In operation 1321, the second electronic device 220 may transmit (Ranging response) the data frame including RCDT(2) IE and RRRT IE to the first electronic device 210. In operation 1331, the third electronic device 230 may transmit (Ranging response) the data frame including RCDT(2) IE and RRRT IE to the first electronic device 210. In operation 1341, the N-th electronic device 240 may transmit (Ranging response) the data frame including RCDT(2) IE and RRRT IE to the first electronic device 210. At this time, each of the second electronic device 220, the third electronic device 230, and the N-th electronic device 240 may measure $T_{reply1}$. As described above, the frame including RCDT(2) IE may form a request for a second TX-to-RX round-trip measurement while continuing the DS-TWR.

In operation 1313, the first electronic device 210 may broadcast (Ranging final) a data frame including RRTI IE ($T_{reply2}$) and RRTM IE ($T_{round1}$), which are each timestamp information, to each of the second electronic device 220, the third electronic device 230, and the N-th electronic device 240.

According to the (1-1)th embodiment, the first electronic device 210 may broadcast the data frame including RRTI IE ($T_{reply2}$) and RRTM IE ($T_{round1}$) via Ranging final. The first electronic device 210 may not request the second electronic device 220, the third electronic device 230, and the N-th electronic device 240 for measured ToF values.

Figure 14:
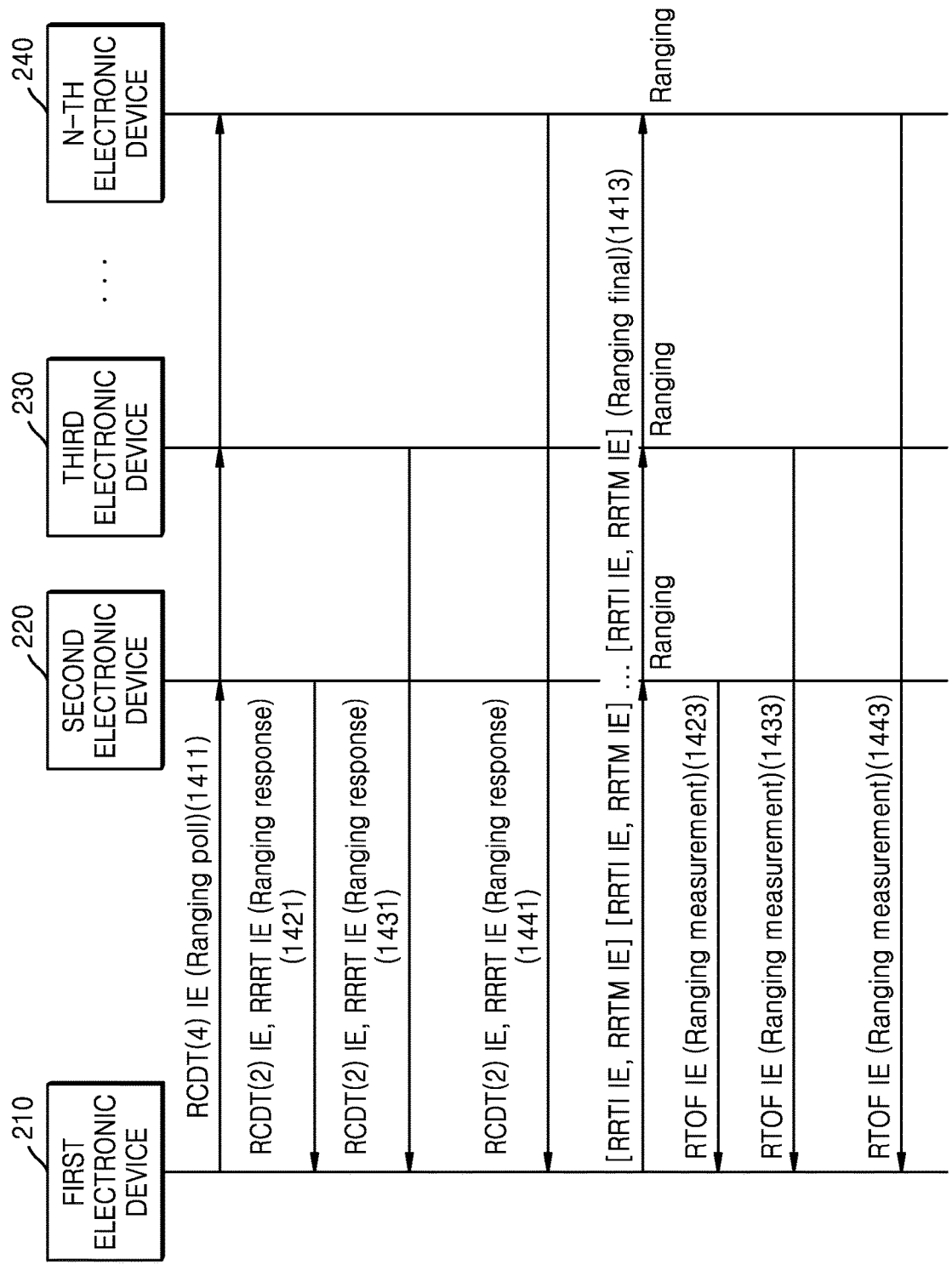
FIG. 14 is a schematic diagram for explaining ranging operations of electronic devices, according to a (1-2)th embodiment.

FIG. 14 is a schematic diagram for explaining ranging operations of electronic devices, according to a (1-2)th embodiment.

Referring to FIG. 14, in operation 1411, the first electronic device 210 may start a ranging operation (Ranging poll) by broadcasting a data frame including RCDT(4) IE to the second electronic device 220, the third electronic device 230, and the N-th electronic device 240. As described above, the frame including RCDT(4) IE may initiate broadcast/multicast DS-TWR and request that the ranging result is sent when exchange ends.

In operation 1421, the second electronic device 220 may transmit (Ranging response) the data frame including RCDT(2) IE and RRRT IE to the first electronic device 210. In operation 1431, the third electronic device 230 may transmit (Ranging response) the data frame including RCDT(2) IE and RRRT IE to the first electronic device 210. In operation 1441, the N-th electronic device 240 may transmit (Ranging response) the data frame including RCDT(2) IE and RRRT IE to the first electronic device 210. At this time, each of the second electronic device 220, the third electronic device 230, and the N-th electronic device 240 may measure $T_{reply1}$. As described above, the frame including RCDT(2) IE may form a request for a second TX-to-RX round-trip measurement while continuing the DS-TWR.

In operation 1413, the first electronic device 210 may broadcast (Ranging final) a data frame including RRTI IE ($T_{reply2}$) and RRTM IE ($T_{round1}$) which are each timestamp information, to each of the second electronic device 220, the third electronic device 230, and the N-th electronic device 240.

The second electronic device 220 may measure a value of $T_{round2}$, and may calculate the ToF time $T_{prop}$ according to Equation 1 described above.

An estimated distance (Ranging) between two electronic devices may be calculated by multiplying $T_{prop}$ by speed of light.

In operation 1423, the second electronic device 220 may transmit (Ranging measurement) a product of the calculated $T_{prop}$ or $T_{prop}$ and the speed of light to the first electronic device 210 via an RTOF IE. In operation 1433, the third electronic device 230 may transmit (Ranging measurement) a product of the calculated $T_{prop}$ or $T_{prop}$ and the speed of light to the first electronic device 210 via an RTOF IE. In operation 1443, the N-th electronic device 240 may transmit (Ranging measurement) a product of the calculated $T_{prop}$ or $T_{prop}$ and the speed of light to the first electronic device 210 via an RTOF IE.

According to the (1-2)th embodiment, the first electronic device 210 may broadcast the data frame including RRTI IE($T_{reply2}$) and RRTM IE ($T_{round1}$) via Ranging final. The first electronic device 210 may request the second electronic device 220, the third electronic device 230, and the N-th electronic device 240 for measured ToF values.

Figure 15:
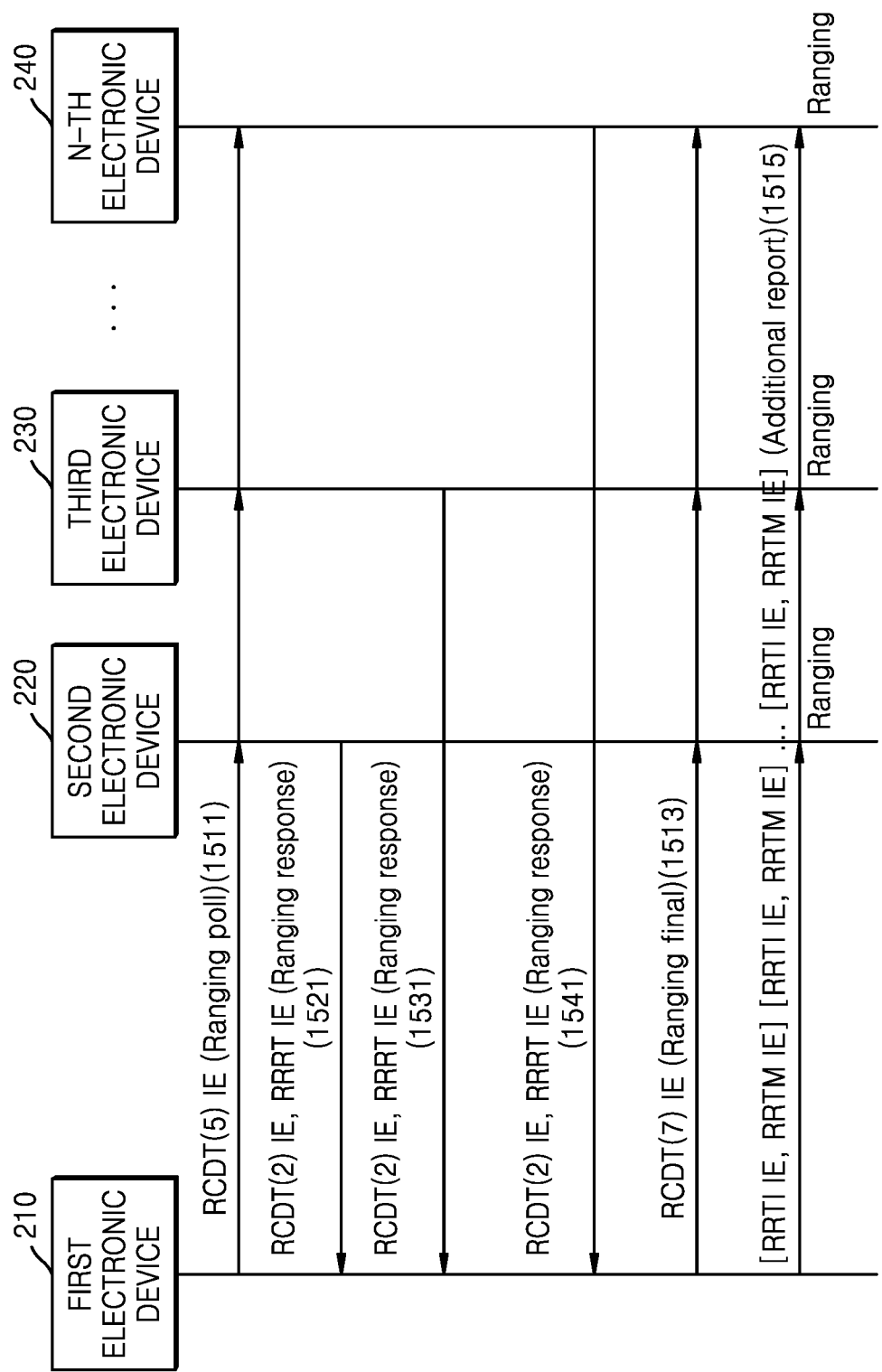
FIG. 15 is a schematic diagram for explaining ranging operations of electronic devices, according to a (1-3)th embodiment.

FIG. 15 is a schematic diagram for explaining ranging operations of electronic devices, according to a (1-3)th embodiment.

Referring to FIG. 15, in operation 1511, the first electronic device 210 may start a ranging operation (Ranging poll) by broadcasting a data frame including RCDT(5) IE to the second electronic device 220, the third electronic device 230, and the N-th electronic device 240. As described above, the frame including RCDT(5) IE may initiate broadcast/multicast DS-TWR with an additional report message for timestamp measurement, and may indicate that the transmitter does not require a ranging result.

In operation 1521, the second electronic device 220 may transmit (Ranging response) the data frame including RCDT(2) IE and RRRT IE to the first electronic device 210. In operation 1531, the third electronic device 230 may transmit (Ranging response) the data frame including RCDT(2) IE and RRRT IE to the first electronic device 210. In operation 1541, the N-th electronic device 240 may transmit (Ranging response) the data frame including RCDT(2) IE and RRRT IE to the first electronic device 210. At this time, each of the second electronic device 220, the third electronic device 230, and the N-th electronic device 240 may measure $T_{reply1}$. As described above, the frame including RCDT(2) IE may form a request for a second TX-to-RX round-trip measurement while continuing the DS-TWR.

In operation 1513, the first electronic device 210 may broadcast (Ranging final) a data frame including RCDE(7) IE for a Ranging final message to the second electronic device 220, the third electronic device 230, and the N-th electronic device 240. As described above, the frame including RCDT(7) IE may indicate a Ranging Final message without timestamps in the broadcast/multicast DS-TWR.

In operation 1515, the first electronic device 210 may broadcast (Additional report) a data frame including RRTI IE ($T_{reply2}$) and RRTM IE ($T_{round1}$) which are each timestamp information, to each of the second electronic device 220, the third electronic device 230, and the N-th electronic device 240.

In other words, in contrast with the (1-1)th embodiment described above, in the (1-3)th embodiment, RCDT(5) IE and RCDT(7) IE are used, and thus the data frame including RRTI IE($T_{reply2}$) and RRTM IE ($T_{round1}$), which are each timestamp information, may be transmitted via an Additional report message other than a Ranging Final message.

According to the (1-3)th embodiment, the first electronic device 210 may broadcast the data frame including RRTI IE($T_{reply2}$) and RRTM IE ($T_{round1}$) via the Additional report message. The first electronic device 210 may not request the second electronic device 220, the third electronic device 230, and the N-th electronic device 240 for measured ToF values.

Figure 16:
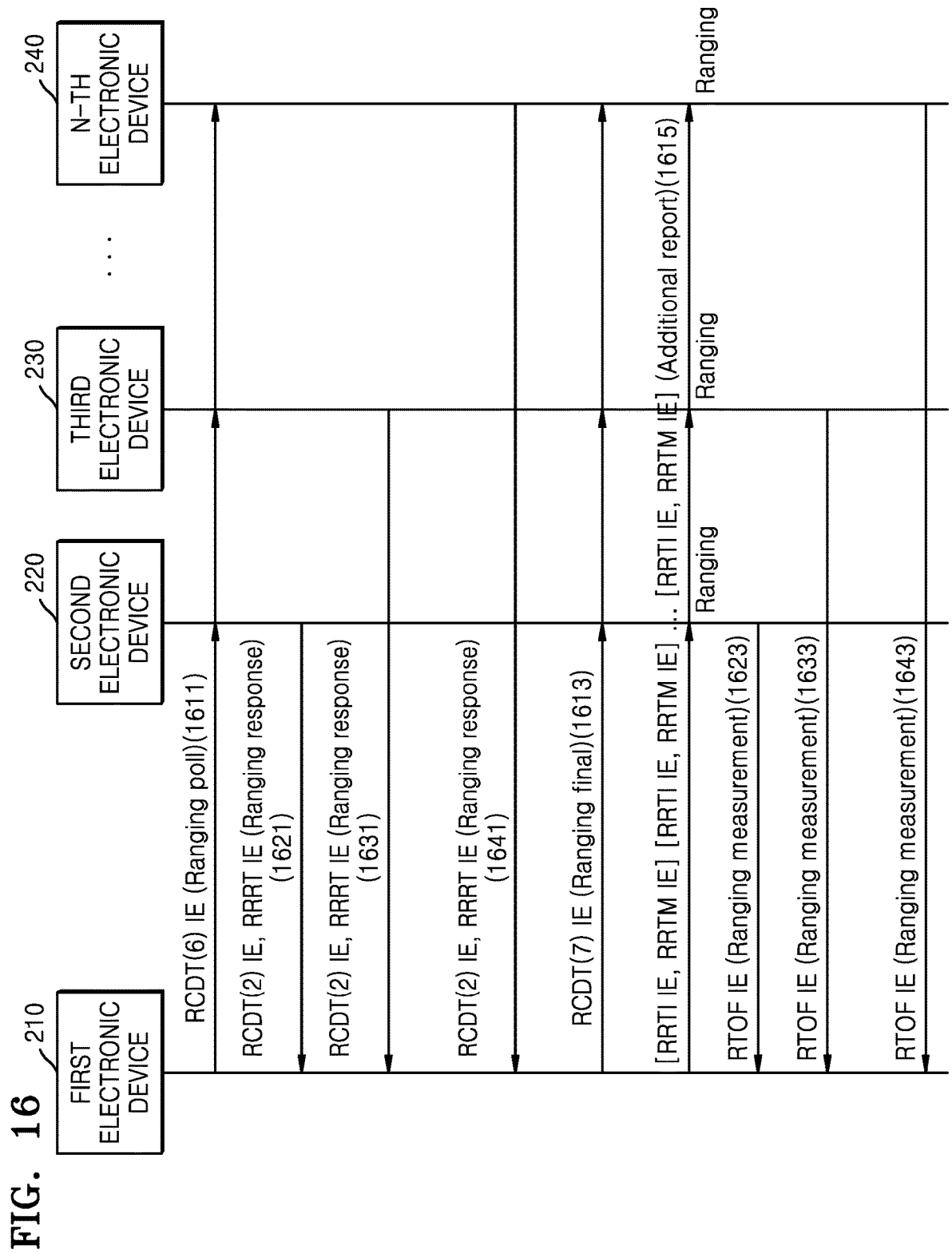
FIG. 16 is a schematic diagram for explaining ranging operations of electronic devices, according to a (1-4)th embodiment.

FIG. 16 is a schematic diagram for explaining ranging operations of electronic devices, according to a (1-4)th embodiment.

Referring to FIG. 16, in operation 1611, the first electronic device 210 may start a ranging operation (Ranging poll) by broadcasting a data frame including RCDT(6) IE to the second electronic device 220, the third electronic device 230, and the N-th electronic device 240. As described above, the frame including RCDT(6) IE may initiate broadcast/multicast DS-TWR with an additional report message for timestamp measurement, and may request that a ranging result is sent when exchange ends.

In operation 1621, the second electronic device 220 may transmit (Ranging response) the data frame including RCDT (2) IE and RRRT IE to the first electronic device 210. In operation 1631, the third electronic device 230 may transmit (Ranging response) the data frame including RCDT(2) IE and RRRT IE to the first electronic device 210. In operation 1641, the N-th electronic device 240 may transmit (Ranging response) the data frame including RCDT(2) IE and RRRT IE to the first electronic device 210. At this time, each of the second electronic device 220, the third electronic device 230, and the N-th electronic device 240 may measure $T_{reply1}$. As described above, the frame including RCDT(2) IE may form a request for a second TX-to-RX round-trip measurement while continuing the DS-TWR.

In operation 1613, the first electronic device 210 may broadcast (Ranging final) a data frame including RCDE(7) IE for a Ranging final message to the second electronic device 220), the third electronic device 230, and the N-th electronic device 240. As described above, the frame including RCDT(7) IE may indicate a Ranging Final message without timestamps in the broadcast/multicast DS-TWR.

In operation 1615, the first electronic device 210 may broadcast (Additional report) a data frame including RRTI IE ($T_{reply2}$) and RRTM IE ($T_{round1}$), which are each timestamp information, to each of the second electronic device 220, the third electronic device 230, and the N-th electronic device 240. In other words, in contrast with the (1-2)th embodiment of the disclosure, in the (1-4)th embodiment described above, RCDT(6) IE and RCDT(7) IE are used, and thus the data frame including RRTI IE($T_{reply2}$) and RRTM IE ($T_{round1}$), which are each timestamp information, may be transmitted via an Additional report message other than a Ranging Final message.

In operation 1623, the second electronic device 220 may transmit (Ranging measurement) a product of the calculated $T_{prop}$ or $T_{prop}$ and the speed of light (3*10^8 m/s) to the first electronic device 210 via an RTOF IE. In operation 1633, the third electronic device 230 may transmit (Ranging measurement) a product of the calculated $T_{prop}$ or $T_{prop}$ and the speed of light (3*10^8 m/s) to the first electronic device 210 via an RTOF IE. In operation 1641, the N-th electronic device 240 may transmit (Ranging measurement) a product of the calculated $T_{prop}$ or $T_{prop}$ and the speed of light (3*10^8 m/s) to the first electronic device 210 via an RTOF IE.

According to the (1-4)th embodiment, the first electronic device 210 may broadcast the data frame including RRTI IE($T_{reply2}$) and RRTM IE ($T_{round1}$) via the Additional report message. The first electronic device 210 may request the second electronic device 220, the third electronic device 230, and the N-th electronic device 240 for measured ToF values.

Figure 17:
FIG. 17 is a table for explaining information for a secure ranging operation, according to a second embodiment.

FIG. 17 is a table for explaining information for a secure ranging operation, according to a second embodiment.

Referring to FIG. 17, the IE ID 420 of the payload IEs 410 may include an ID corresponding to a Sequential Ranging Control (SRC) IE. The IE content 430 of the payload IEs 410 may include information corresponding to the SRC IE.

The information corresponding to the SRC IE, which is included in the IE content 430, may include an SRC information value 1710, an interval 1720, and a Scrambled Timestamp Sequence (STS) Data Init 1730.

The SRC information value 1710 may indicate whether a ranging operation is a normal ranging operation or a secure ranging operation. In detail, when the SRC information value 1710 is 0, this frame may indicate that a next frame is initiating a normal ranging procedure with the interval. After this interval, a next ranging session is started. When the SRC information value 1710 is 1, this frame may indicate that a next frame is initiating a normal ranging procedure with the STS Data Init and the interval. After this interval, a next ranging session is started. The SRC information value 1710 may consist of one byte (Octets: 1).

The interval 1720 may refer to a time period between a starting time point of a first ranging operation and a starting time point of a second ranging operation. Alternatively, the interval 1720 may refer to a time period between a time point when a first SRC IE is transmitted and a time point when a second SRC IE is transmitted. The interval 1720 may consist of three bytes (Octets: 3), and may not be included in the IE content 430 (Octets: 0).

The STS Data Init 1730 refers to an initial value used for performing STS-based secure ranging. The STS Data Init 1730 may consist of 4 bytes, 8 bytes, or 12 bytes, and may not be included in the IE content 430 (Octets: 0). In detail, in a secure ranging session, 128N bits of STS may be generated for every packet via the STS Data Init 1730.

Figure 18:
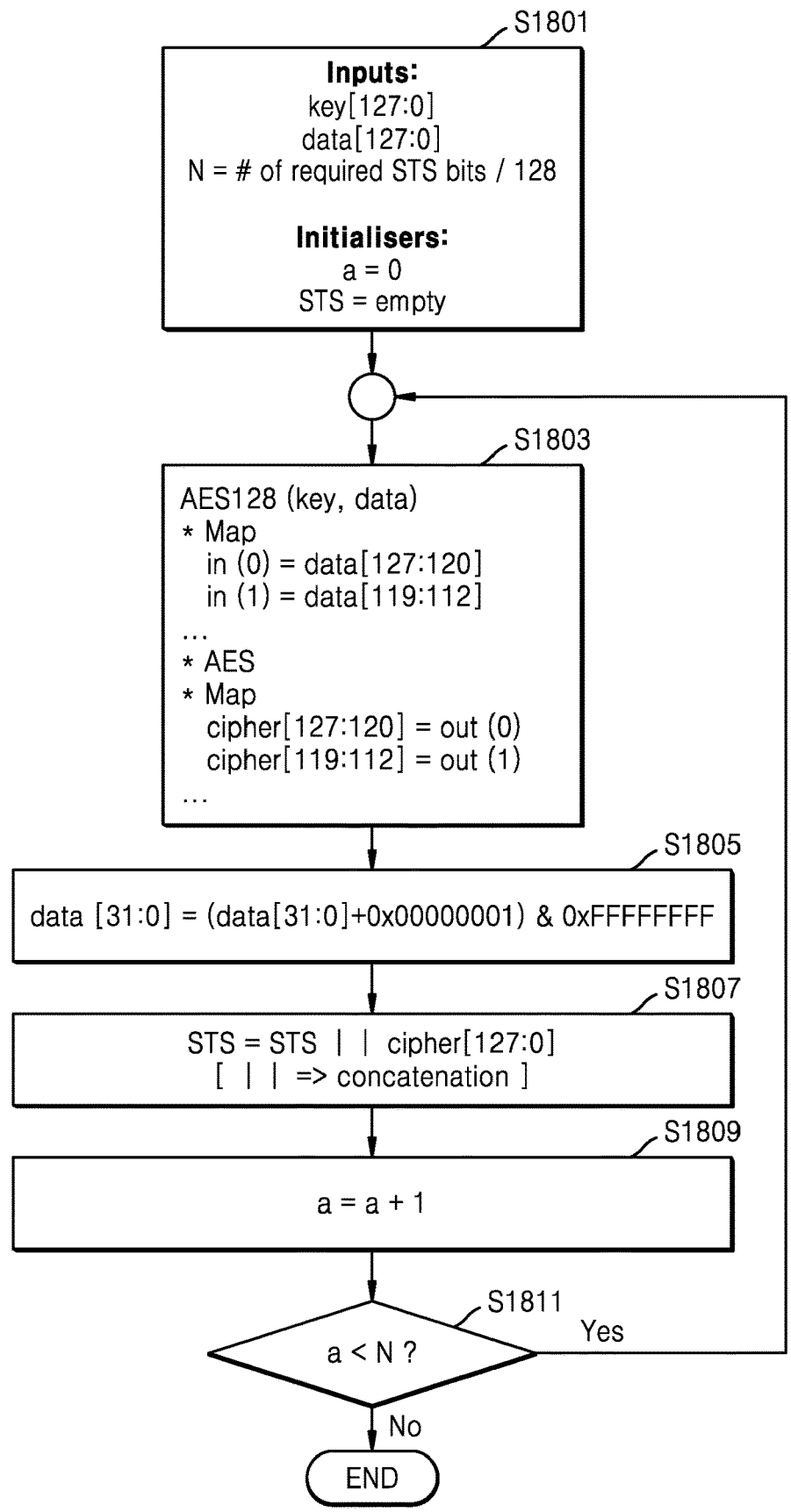
FIG. 18 is a flowchart of a Scrambled Timestamp Sequence (STS) generation procedure according to a second embodiment.

FIG. 18 is a flowchart of an STS generation procedure according to a second embodiment.

Referring to FIG. 18, in operation S1801, a 256 bit session key between two electronic devices to perform a secure ranging operation may be input as an input value of a deterministic random bit generator (DRBG) and may be divided into a 128 bit key and a 128 bit data block. In operation S1801, N may refer to a value obtained by dividing the number of required STS bits by 128. At first, a may be defined as 0, and an STS may be defined as empty.

In operation S1803, an AES128 encryption process may be performed via two input values, namely, a 128 bit key and a 128 bit data block. In the AES128 encryption process, 128 bit data may be transformed into block data that is referred to as sixteen 8 bit in. Thereafter, based on 128 bit key information, a 128 bit cipher may be finally generated via a block encryption operation.

In operation S1805, a data[31:0] value may be updated to data[31:0]=(data[31:0]+0x00000001) & 0xFFFFFFFF.

In operation S1807, a 128 bit cipher may be concatenated to the STS via a process of STS=STS∥cipher[127:0].

Via operations S1809 and S1811, the value of a may increase iteratively by 1 until a condition of a<N is satisfied, and a final 128*N bit STS may be generated. Accordingly, N different 128 bits constituting the final 128N bit STS may be generated.

In FIG. 18, a process of updating an STS between packets in one session is omitted. Data[127:32] may be used to achieve the inter-packet STS updating process, and an initial value used in update is used for an STS updating process. A value corresponding to this may be defined as the STS Data Init. The length of the STS Data Init may be defined as 4 bytes, 8 bytes, 12 bytes, or the like. Application examples of STS Data Init of 4 bytes are as follows:

data[63:32]=(data[63:32]+STS Data Init) & 0xFFFFFFFF

The same principle is applicable to STS Data Init of 8 bytes, 12 bytes, and the like.

FIG. 19 is a table for explaining an example of information corresponding to an SRC IE according to a (2-1)th embodiment.

Referring to FIG. 19 the information corresponding to the SRC IE, which is included in the IE content 430, may include an SRC information value 1710, an interval 1720, and an STS Data Init 1730.

The SRC information value 1710 may consist of one byte, and, for example, may have a 0x0 value 1910. A case where the SRC information value 1710 has the 0x0 value 1910 may be referred to as a normal ranging mode. The normal ranging mode refers to a general ranging operation between a plurality of electronic devices described above with reference to FIG. 11 and FIGS. 13 through 16.

The interval 1720 may consist of three bytes, and, for example, may have a 0x64 value 1920.

The STS Data Init 1730 may consist of 4 bytes, 8 bytes, or 12 bytes. Alternatively, the STS Data Init 1730 may not be included in the IE content 430 (Octets: 0). In FIG. 19, a case where the STS Data Init 1730 is not included in the IE content 430 is represented as X 1930. The case where the STS Data Init 1730 is not included in the IE content 430 may be referred to as a normal ranging mode.

Figure 20:
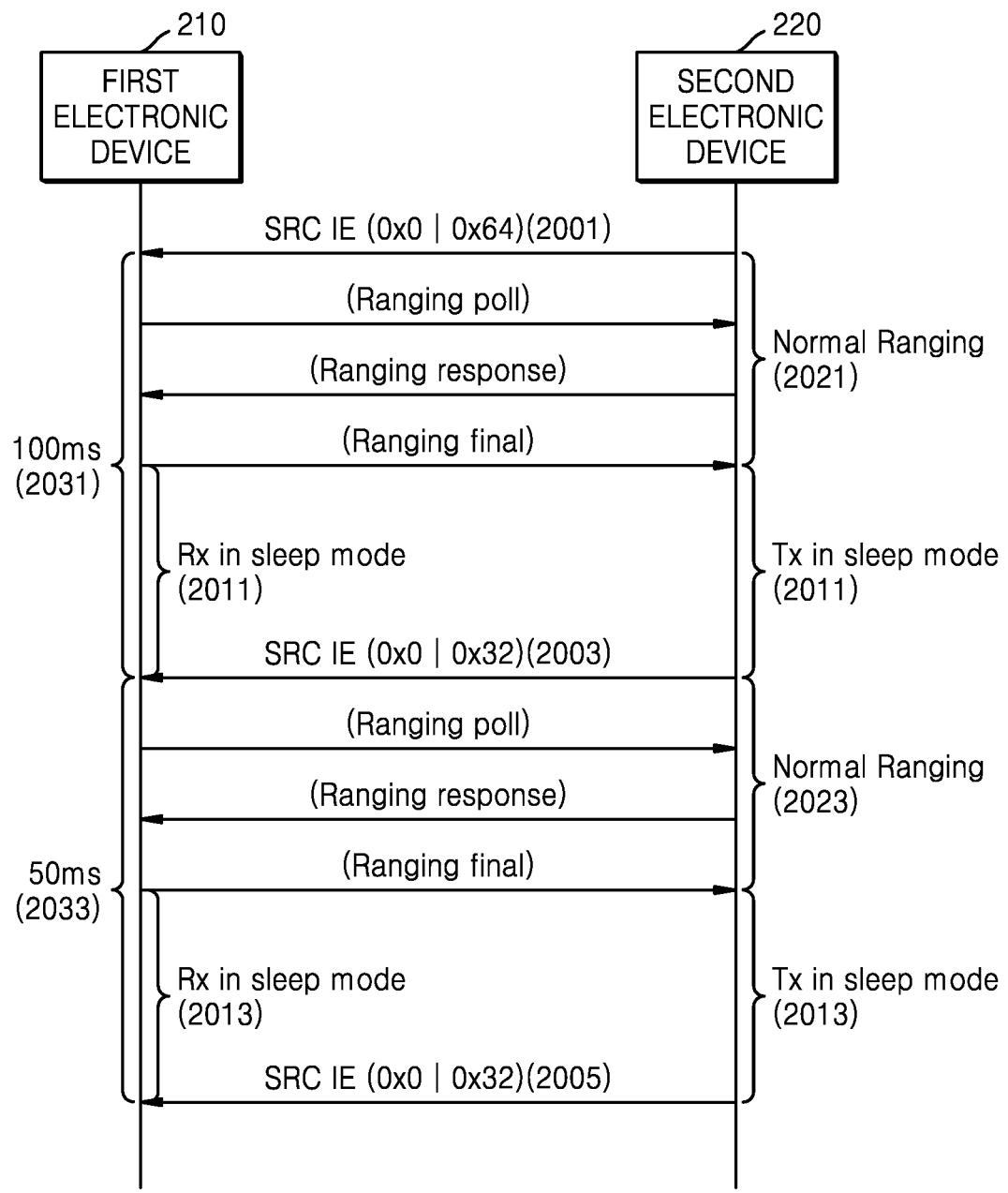
FIG. 20 schematically illustrates an operation method of an electronic device that takes into account a plurality of ranging procedures according to a (2-1)th embodiment.

FIG. 20 schematically illustrates an operation method of an electronic device that takes into account a plurality of ranging procedures according to a (2-1)th embodiment.

As described above, when a plurality of ranging procedures is consecutively considered, the electronic device may convert a mode into a sleep mode and an active mode according to IE information, via an IE for ranging start information and ranging duration information.

Referring to FIG. 20, the second electronic device 220 may transmit an SRC IE 2001 to the first electronic device 210. As described above with reference to FIG. 19, the SRC IE 2001 may have an 0x0 value as the SRC information value 1710 and may have the 0x64 value 1920 as the interval 1720. The STS Data Init 1730 is not included in the IE content 430.

Because the SRC information value 1710 is a 0x0 value, an operation between the first electronic device 210 and the second electronic device 220 may be referred to as a normal ranging mode 2021. When the interval 1720 has the 0x64 value 1920, an interval between a time point when the SRC IE 2001 is transmitted and a time point when an SRC IE 2003 is transmitted may be determined to be 100 ms 2031. The first electronic device 210 and the second electronic device 220 may be converted into a sleep mode 2011 after a Ranging final operation. After the sleep mode 2011 is terminated, the sleep mode 2011 may be converted into an active mode 2023.

The first electronic device 210 may transmit the SRC IE 2003 to the second electronic device 220. The second electronic device 220 may transmit an SRC IE 2005 to the first electronic device 210. The SRC IE 2003 and the SRC IE 2005 may have a 0x0 value as the SRC information value 1710 and may have a 0x32 value as the interval 1720. The STS Data Init 1730 is not included in the IE content 430.

Because the SRC information value 1710 is a 0x0 value, an operation between the first electronic device 210 and the second electronic device 220 may be referred to as a normal ranging mode 2023. When the interval 1720 has a 0x32 value, an interval between a time point when the SRC IE 2003 is transmitted and a time point when an SRC IE 2005 is transmitted may be determined to be 50 ms 2033. The first electronic device 210 and the second electronic device 220 may be converted into a sleep mode 2013 after a Ranging final operation. After the sleep mode 2013 is terminated, the sleep mode 2013 may be converted into an active mode.

FIG. 21 is a table for explaining an example of information corresponding to an SRC IE according to a (2-2)th embodiment.

Referring to FIG. 21, the information corresponding to the SRC IE, which is included in the IE content 430, may include an SRC information value 1710, an interval 1720, and an STS Data Init 1730.

The SRC information value 1710 may consist of one byte, and, for example, may have a 0x1 value 2110. A case where the SRC information value 1710 has the 0x1 value 2110 may be referred to as a secure ranging mode.

The interval 1722 may consist of three bytes, and, for example, may have a 0x64 value 2120.

The STS Data Init 1730 may consist of 4 bytes, 8 bytes, or 12 bytes, and, for example, may have a 0x0x325041592E535953 value 2130. A case where the STS Data Init 1730 is included in the IE content 430 may be referred to as a secure ranging mode.

Figure 22:
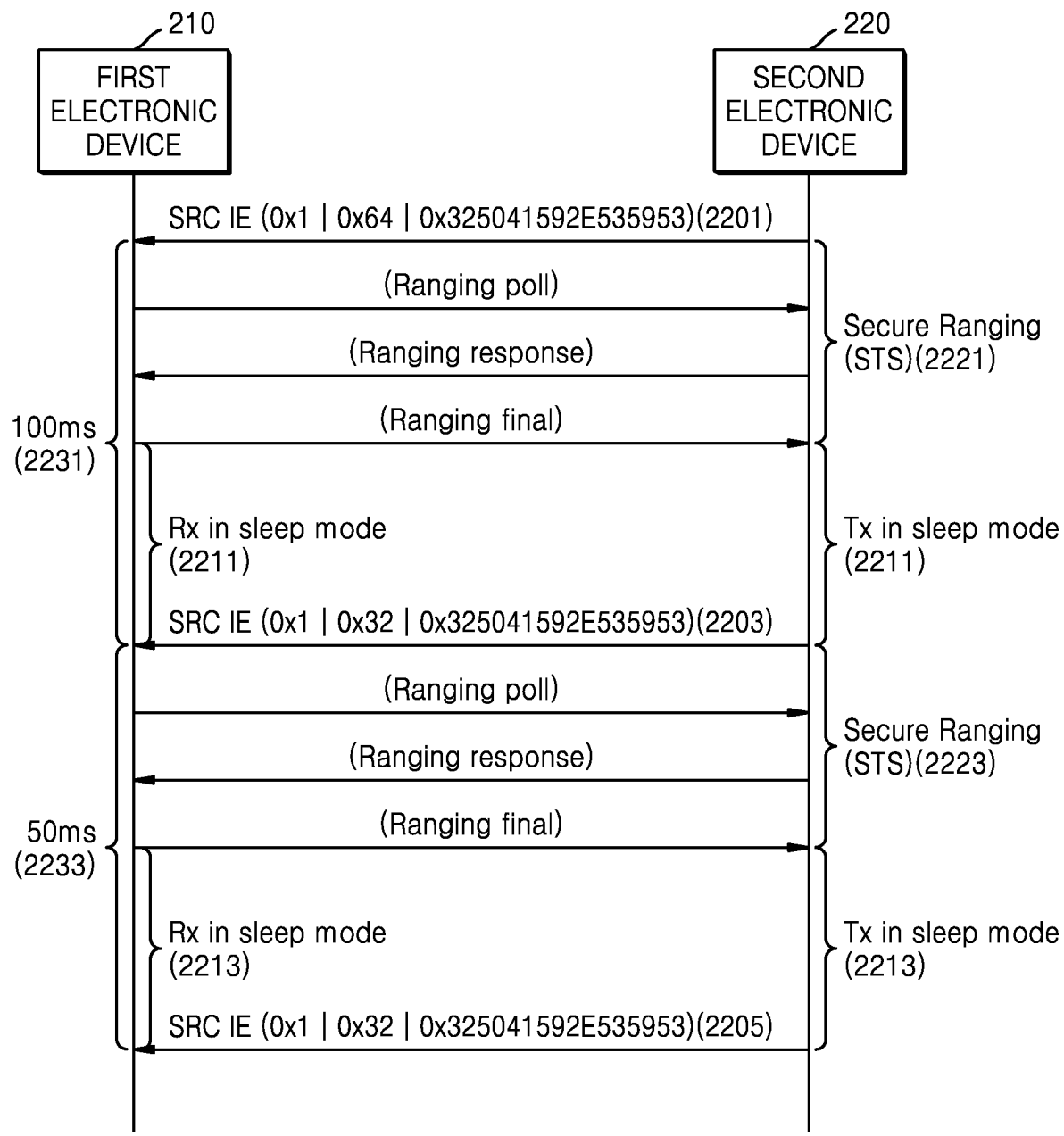
FIG. 22 schematically illustrates an operation method of an electronic device that takes into account a plurality of ranging procedures according to a (2-2)th embodiment.

FIG. 22 schematically illustrates an operation method of an electronic device that takes into account a plurality of ranging procedures according to a (2-2)th embodiment.

As described above, when a plurality of ranging procedures is consecutively considered, the electronic device may convert a mode into a sleep mode and an active mode according to IE information, via an IE for ranging start information and ranging duration information.

Referring to FIG. 22, the second electronic device 220 may transmit an SRC IE 2201 to the first electronic device 210. As described above with reference to FIG. 21, the SRC IE 2201 may have an 0x1 value as the SRC information value 1710 and may have the 0x64 value 2122 as the interval 1722. The STS Data Init 1730 may have a 0x325041592E535953 value.

Because the SRC information value 1710 is a 0x1 value, an operation between the first electronic device 210 and the second electronic device 220 may be referred to as a secure ranging mode 2221. When the interval 1722 has the 0x64 value 2122, an interval between a time point when the SRC IE 2201 is transmitted and a time point when an SRC IE 2203 is transmitted may be determined to be 100 ms 2231.

The first electronic device 210 and the second electronic device 220 may be converted into a sleep mode 2211 after a Ranging final operation. After the sleep mode 2211 is terminated, the sleep mode 2211 may be converted (e.g., transition) into an active mode 2223.

The first electronic device 210 may transmit the SRC IE 2203 to the second electronic device 220. The second electronic device 220 may transmit an SRC IE 2205 to the first electronic device 210. The SRC IE 2203 and the SRC IE 2205 may have a 0x1 value as the SRC information value 1710 and may have a 0x32 value as the interval 1722. The STS Data Init 1730 may have a 0x325041592E535957 value.

Because the SRC information value 1710 is a 0x1 value, an operation between the first electronic device 210 and the second electronic device 220 may be referred to as a secure ranging mode 2223. When the interval 1722 has a 0x32 value, an interval between a time point when the SRC IE 2203 is transmitted and a time point when an SRC IE 2205 is transmitted may be determined to be 50 ms 2233. The first electronic device 210 and the second electronic device 220 may be converted into a sleep mode 2213 after a Ranging final operation. After the sleep mode 2213 is terminated, the sleep mode 2213 may be converted into an active mode.

FIG. 23 is a table for explaining a structure of a content field of an IE related with timestamp measurement information according to a third embodiment.

Referring to FIG. 23, a content field of each of the RRTI IE 502, the RRTD IE 503, and the RRTM IE 506 according to an embodiment may include a receiver (RX) to transmitter (TX) reply time/TX to RX round-trip time 2311 and a ranging FoM 2313.

The ranging FoM 2313 may include an extension 2321, a confidence interval scaling factor field 2323, a confidence interval field 2325, and a confidence level field 2327. The confidence level field 2327 may consist of bit 0 through bit 2. The confidence level field 2327 may be referred to as a confidence level 2327. The confidence interval field 2325 may consist of bit 3 and bit 4. The confidence interval scaling factor field 2323 may consist of bit 5 and bit 6. The extension 2321 may consist of bit 7.

The confidence level 2327 may refer to a probability value representing whether a Ranging Marker (RMARKER) determining a specific time point within a frame exists within an overall confidence interval. The overall confidence interval may be defined as a product of the confidence interval 2325 and the confidence interval scaling factor field 2323.

Eight different FoMs may be expressed according to the values of bits 0 through 2 of the confidence level field 2327. For example, when the confidence level field 2327 is 000, "no FoM", i.e., no information is provided about the quality of a ranging measurement, may be defined. When the confidence level field 2327 is 111, an FoM may be defined as 99%.

The confidence interval field 2325 may indicate four different confidence intervals according to the values of bits 3 and 4. For example, when the confidence interval field 2325 is 00, a confidence interval may be defined as 100 ps.

The confidence interval scaling factor field 2323 may indicate four different confidence interval scaling factors according to the values of bits 5 and 6. For example, when the confidence interval scaling factor field 2323 is 00, a confidence interval scaling factor may mean ½ of a corresponding confidence interval.

The extension 2321 may define situations of the ranging FoM 2313. When the extension 2321 has a bit value of 0 and any one of bits 6 through 0 is 1, this indicates a situation in which "Ranging FoM value if a timestamp value was obtained without STSs."

When the extension 2321 has a bit value of 1 and bits 6 through 0 are all 0, this indicates a situation in which "The timestamp report is uncorrected."

When the extension 2321 has a bit value of 1 and any one of bits 6 through 0 is 1, this indicates a situation in which "Ranging FoM value if a timestamp value was obtained with STSs."

According to an embodiment, ranging usability of the electronic device may be increased via ranging FoM information that is reliability information of timestamp measurement information.

Figures 24, 25:
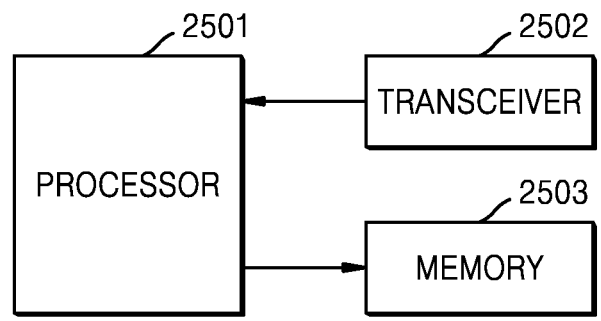
FIG. 24 is a table for explaining an Angle of Arrival according to a fourth embodiment.
FIG. 25 illustrates a configuration of an electronic device, according to an embodiment.

FIG. 24 is a table for explaining an Angle of Arrival according to a fourth embodiment.

According to an embodiment, an electronic device may utilize an angle of arrival (AOA) in a ranging operation for estimating a location of the electronic device relative to another electronic device.

Furthermore, according to an embodiment, the IE ID 420 of the payload IEs 410 may further include an ID corresponding to an AOA IE. The IE content 430 of the payload IEs 410 may include information corresponding to the AOA IE.

As shown in FIG. 24, a content field 2400 of the AOA IE may consist of 2 bytes (octets: 2). The content field 2400 of the AOA may indicate that an angle of the electronic device relative to the other electronic device ranges from −180° to +180°. The angle may be two-dimensional or three-dimensional.

According to an embodiment, when angle information is considered to estimate the location of the electronic device, the electronic device may operate regardless of a UWB chip manufacturer, via an AOA IE. Thus, power efficiency of the electronic device and network efficiency may be increased.

FIG. 25 illustrates a configuration of an electronic device, according to an embodiment.

Referring to FIG. 25, the electronic device may include a processor 2501, a transceiver 2502, and a memory 2503. The processor 2501 may indicate one processor or a plurality of processors, the transceiver 2502 may indicate one transceiver or a plurality of transceivers, and the memory 2503 may indicate one memory or a plurality of memories.

In the disclosure, the processor 2501 may be defined as an integrated circuit or at least one processor dedicated to a circuit or an application.

The processor 2501 according to an embodiment may control all operations of the electronic device. For example, the processor 2501 may control a signal flow between blocks so as to allow operations to be performed according to the aforementioned flowcharts. Also, the processor 2501 may write data to and read data from the memory 2503. In addition, the processor 2501 may perform functions of a protocol stack, pursuant to a communication standard. To this end, the processor 2501 may include at least one processor or microprocessor, or may be a part of another processor. Also, a part of the transceiver 2502 and the processor 2501 may be referred to as a communication processor (CP).

According to an embodiment, the processor 2501 may control operations of the electronic device, which are described above with reference to FIGS. 1 through 24.

The transceiver 2502 according to an embodiment may perform functions for transceiving a signal via a wireless channel. For example, the transceiver 2502 may perform conversion between a baseband signal and a bitstream based on physical layer specifications of a system. For data transmission, the transceiver 2502 may generate complex symbols by encoding and modulating a transmit bit string. For data reception, the transceiver 2502 may reconstruct a received bit stream by demodulating and decoding a baseband signal. Also, the transceiver 2502 may up-convert a baseband signal into a RF band signal and then may transmit the RF band signal through an antenna, and may down-convert an RF band signal received through an antenna, into a baseband signal. For example, the transceiver 2502 may include at least one of a transmitting filter, a receiving filter, an amplifier, a mixer, an oscillator, a digital-to-analog converter (DAC), an analog-to-digital converter (ADC), or the like. Also, the transceiver 2502 may include a plurality of transceiving paths. In addition, the transceiver 2502 may include at least one antenna array including a plurality of antenna elements. In a hardware aspect, the transceiver 2502 may include a digital circuit and an analog circuit (e.g., a radio frequency integrated circuit (RFIC)). In this regard, the digital circuit and the analog circuit may be implemented as one package. Also, the transceiver 2502 may include a plurality of RF chains. The transceiver 2502 may include a first transceiver and a second transceiver. The first transceiver may support first communication, and the second transceiver may support second communication.

Although FIG. 25 illustrates one transceiver 2502, the first transceiver supporting the first communication, and the second transceiver supporting the second communication may exist as separate transceivers.

The memory 2503 according to an embodiment may store data such as basic programs, application programs, instructions, code, setup information or the like, for operations of the electronic device. The memory 2503 may be implemented as a volatile memory, a non-volatile memory, or a combination of a volatile memory and a non-volatile memory. The memory 2503 may provide stored data, in response to a request by the processor 2501. The memory 2503 may store at least one of information transceived by the transceiver 2502 or information generated by the processor 2501.

The processor 2501 according to an embodiment may execute the programs stored in the memory 2503, to broadcast or multicast a ranging start message including first data, receive a ranging response message including second data from another electrode device, and broadcast or multicast a ranging final message including third data.

The methods according to embodiments described above or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments as described above or in the following claims.

The programs (e.g., software modules or software) may be stored in non-volatile memory (including random access memory (RAM) or flash memory), read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device implementing embodiments via an external port. Furthermore, a separate storage device on the communication network may access the electronic device performing the embodiments of the disclosure.

Although various embodiments have been described in detail above, it should be understood that many variations and modifications may be made without departing from the spirit and scope of the inventive concept(s) as defined at least in the appended claims and their equivalents. Therefore, the scope of the disclosure is defined not solely by the detailed description of examples but by at least the appended claims and equivalents to the appended claims.

The block diagrams as described above may be construed by one of ordinary skill in the art as conceptual representation of circuitry for implementing the principles of the disclosure. Similarly, it is also understood by one of ordinary skill in the art that any flowcharts, flow diagrams, state transitions, pseudo codes, etc., may be substantially embodied in a computer-readable medium as various processes that may be carried out by a computer or processor, whether or not the computer or the processor is explicitly shown. Accordingly, the aforementioned embodiments of the disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

Functions of the various elements shown in the drawings may be associated with appropriate software and thus may be provided by the use of dedicated hardware as well as hardware capable of executing the software. When provided by a processor, the functions may be provided by a single dedicated processor, a single shared processor, or a plurality of individual processors in which some of them may be shared. Also, the explicit use of the term "processor" or "controller" should not be interpreted as making exclusive reference to hardware capable of executing software, but may be construed as implicitly including, without limitation, digital signal processor (DSP) hardware, a ROM for storing software, a RAM, and a non-volatile storage device.

In the attached claims of the disclosure, an element represented as a unit for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intend that particular properties, structures, features, etc., are included in at least one embodiment. Thus, the term "an embodiment" and any other modifications provided in the specification do not necessarily refer to the same embodiment.

Throughout the disclosure, expressions such as "at least one of a or b" indicates only a, only b, or both a and b. Additionally, throughout the disclosure, expressions such as "at least one of a, b or c" indicates only a, only b, only c, both a and b, both a and c, both b and c, all of a, b, and c, or variations thereof. Even when more or less items are enumerated, they may be clearly and expansively interpreted by one of ordinary skill in the art.

The disclosure has been particularly shown and described with reference to embodiments.

It is to be understood that all embodiments of the disclosure and conditional exemplification as disclosed in the specification are intended to assist one of ordinary skill in the art in understanding the principles and concepts of the disclosure, and thus one of ordinary skill in the art may understand that the embodiments may be modified without departing from the substantial characteristics and spirit of the disclosure. Thus, the disclosed embodiments should be considered in a descriptive sense only and not for purposes of limitation. The scope of the disclosure is defined not by the detailed description but by at least the appended claims, and all differences within the scope will be construed as being included in the disclosure.

What is claimed is:

1. An operation method of a first electronic device for transceiving data through ultra-wideband (UWB) in a wireless communication system, the operation method comprising:
broadcasting, by the first electronic device, a ranging message comprising first data, wherein the first data comprises information indicating whether an additional message, which includes measurement information of time, is allowed or not;
receiving, by the first electronic device from a second electronic device, a ranging response message comprising second data;
broadcasting, by the first electronic device, a ranging final message comprising third data; and
broadcasting, by the first electronic device, the additional message in a case that the additional message is allowed,
wherein the additional message including the measurement information of time is different from the ranging final message, and
in a case that the additional message is not allowed, the third data being broadcasted with the ranging final message includes the measurement information of time.

2. The operation method of claim 1, further comprising transmitting, by the first electronic device to the second electronic device, interval information used to schedule a ranging operation.

3. The operation method of claim 1, further comprising transmitting, by the first electronic device to the second electronic device, scrambled timestamp sequence initial information used for security of a ranging operation.

4. The operation method of claim 1, further comprising transmitting, by the first electronic device to the second electronic device, a figure of merit (FoM) for transmission of timestamp measurement information based on a ranging operation.

5. The operation method of claim 4, wherein the FoM comprises information about whether a secure ranging operation has failed.

6. The operation method of claim 1, further comprising transmitting, by the first electronic device to the second electronic device, angle information about an angle with respect to the second electronic device, the angle information being used to estimate a location relative to the second electronic device.

7. The operation method of claim 1, wherein:
the first data comprises first information requesting the second electronic device to measure time of flight (ToF); and
the operation method further comprises receiving, by the first electronic device from the second electronic device, fourth data that is the ToF measured by the second electronic device based on the first information.

8. A first electronic device for transceiving data in a wireless communication system, the first electronic device comprising:
at least one transceiver;
at least one memory storing a program; and
at least one processor configured to execute the program to control the at least one transceiver to:
broadcast a ranging message comprising first data, wherein the first data comprises information indicating whether an additional message, which includes measurement information of time, is allowed or not;
receive, from a second electronic device, a ranging response message comprising second data;
broadcast a ranging final message comprising third data; and
broadcast the additional message in a case that the additional message is allowed,
wherein the additional message including the measurement information of time is different from the ranging final message, and
in a case that the additional message is not allowed, the third data being broadcasted with the ranging final message includes the measurement information of time.

9. The first electronic device of claim 8, wherein the at least one processor is further configured to execute the program to control the at least one transceiver to transmit, to the second electronic device, interval information used to schedule a ranging operation.

10. The first electronic device of claim 8, wherein the at least one processor is further configured to execute the program to control the at least one transceiver to transmit, to the second electronic device, scrambled timestamp sequence initial information used for security of a ranging operation.

11. The first electronic device of claim 8, wherein the at least one processor is further configured to execute the program to control the at least one transceiver to transmit, to the second electronic device, a figure of merit (FoM) for transmission of timestamp measurement information based on a ranging operation.

12. The first electronic device of claim 11, wherein the FoM comprises information about whether a secure ranging operation has failed.

13. The first electronic device of claim 8, wherein the at least one processor is further configured to execute the program to control the at least one transceiver to transmit, to the second electronic device, angle information about an angle with respect to the second electronic device, the angle information being used to estimate a location relative to the second electronic device.

14. The first electronic device of claim 8, wherein:
the first data comprises first information requesting the second electronic device to measure time of flight (ToF); and
the at least one processor is further configured to execute the program to control the at least one transceiver to receive, from the second electronic device, fourth data that is the ToF measured by the second electronic device based on the first information.

15. A non-transitory computer-readable recording medium having recorded thereon instructions executable by at least one processor of a first electronic device to perform an operation method for transceiving data through ultra-wideband (UWB) in a wireless communication system, the operation method comprising:
- broadcasting, by the first electronic device, a ranging message comprising first data, wherein the first data comprises information indicating whether an additional message, which includes measurement information of time, is allowed or not;
- receiving, by the first electronic device from a second electronic device, a ranging response message comprising second data; and
- broadcasting, by the first electronic device, a ranging final message comprising third data; and
- broadcasting, by the first electronic device, the additional message in a case that the additional message is allowed,
- wherein the additional message including the measurement information of time is different from the ranging final message, and
- in a case that the additional message is not allowed, the third data being broadcasted with the ranging final message includes the measurement information of time.

* * * * *